US011836116B2

(12) United States Patent
Roy et al.

(10) Patent No.: US 11,836,116 B2
(45) Date of Patent: Dec. 5, 2023

(54) MANAGING OPERATIONS BETWEEN HETEROGENEOUS FILE SYSTEMS

(71) Applicant: Box, Inc., Redwood City, CA (US)

(72) Inventors: Shubhro Jyoti Roy, Foster City, CA (US); Denis Grenader, Redwood City, CA (US); Oleg Lvovitch, Seattle, WA (US)

(73) Assignee: Box, Inc., Redwood City, CA (US)

( * ) Notice: Subject to any disclaimer, the term of this patent is extended or adjusted under 35 U.S.C. 154(b) by 466 days.

(21) Appl. No.: 16/040,375

(22) Filed: Jul. 19, 2018

(65) Prior Publication Data

US 2019/0026309 A1 Jan. 24, 2019

Related U.S. Application Data

(60) Provisional application No. 62/534,617, filed on Jul. 19, 2017.

(51) Int. Cl.
*G06F 15/16* (2006.01)
*G06F 16/178* (2019.01)
(Continued)

(52) U.S. Cl.
CPC ......... *G06F 16/1794* (2019.01); *G06F 16/16* (2019.01); *G06F 16/162* (2019.01);
(Continued)

(58) Field of Classification Search
CPC .... G06F 16/1794; G06F 16/16; G06F 16/907; G06F 16/188; G06F 16/183; G06F 16/162
See application file for complete search history.

(56) References Cited

U.S. PATENT DOCUMENTS

| | | | |
|---|---|---|---|
| 5,432,918 A * | 7/1995 | Stamm | G06F 9/3836 710/112 |
| 2011/0145499 A1* | 6/2011 | Ananthanarayanan | G06F 12/0866 711/118 |
| 2012/0233293 A1* | 9/2012 | Barton | H04L 67/06 709/219 |

OTHER PUBLICATIONS

Kistler et al. Disconnected Operation in the Coda File System. ACM Transactions on Computer Systems, 10:1, 1992, pp. 3-25. (Year: 1992).*

(Continued)

*Primary Examiner* — Alex Gofman
*Assistant Examiner* — Shelly X Qian
(74) *Attorney, Agent, or Firm* — Vista IP Law Group, LLP

(57) ABSTRACT

Systems and methods for managing file operations over shared content in the presence of two or more heterogeneous file systems. A virtual file system provides data consistency pertaining to asynchronous interactions between the heterogeneous storage systems. Operations of the virtual file system include receiving a file system call from a first storage environment for performing one or more data operations at a second storage environment. After receiving the file system call, the virtual file system issues file system calls to the second storage environment and records a first set of metadata. To determine if and when the one or more data operations at the second storage environment have completed, the virtual file system accesses a second set of metadata from the second storage environment. The two sets of metadata are compared. If there are differences, then the virtual file system performs time delays until the two sets of metadata agree.

20 Claims, 13 Drawing Sheets

(51) Int. Cl.
  *G06F 16/16*    (2019.01)
  *G06F 16/182*   (2019.01)
  *G06F 16/188*   (2019.01)
  *G06F 16/907*   (2019.01)

(52) U.S. Cl.
  CPC .......... *G06F 16/183* (2019.01); *G06F 16/188* (2019.01); *G06F 16/907* (2019.01)

(56) References Cited

OTHER PUBLICATIONS

"What is Amazon DynamoDB?", Amazon AWS, URL:http://docs.aws.com/amazondynamodb/latest/developerguide/Introduction.html, 2018.

Balegas, Valter, et al. "Putting consistency back into eventual consistency." Proceedings of the Tenth European Conference on Computer Systems. 2015.

Daniel C. Weeks, "S3mper: Consistency in the Cloud", The Netflix Tech Blog, URL:https://netflixtechblog.com/s3mper-consistency-in-the-cloud-b6a1076aa4f8, Jan. 9, 2014.

* cited by examiner

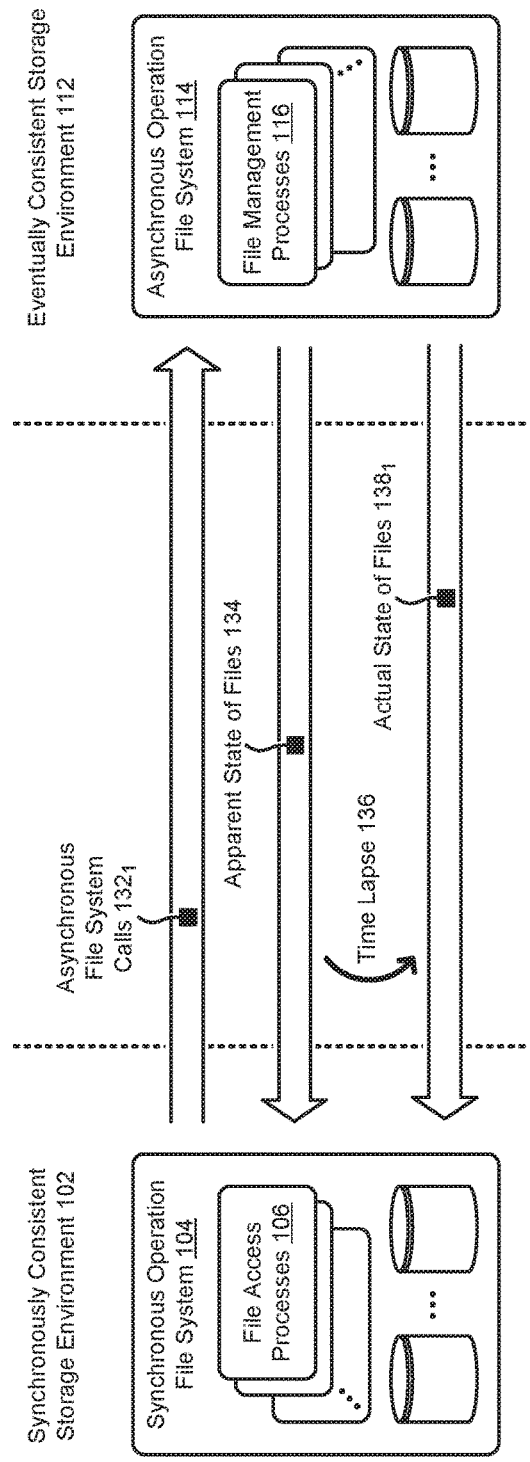
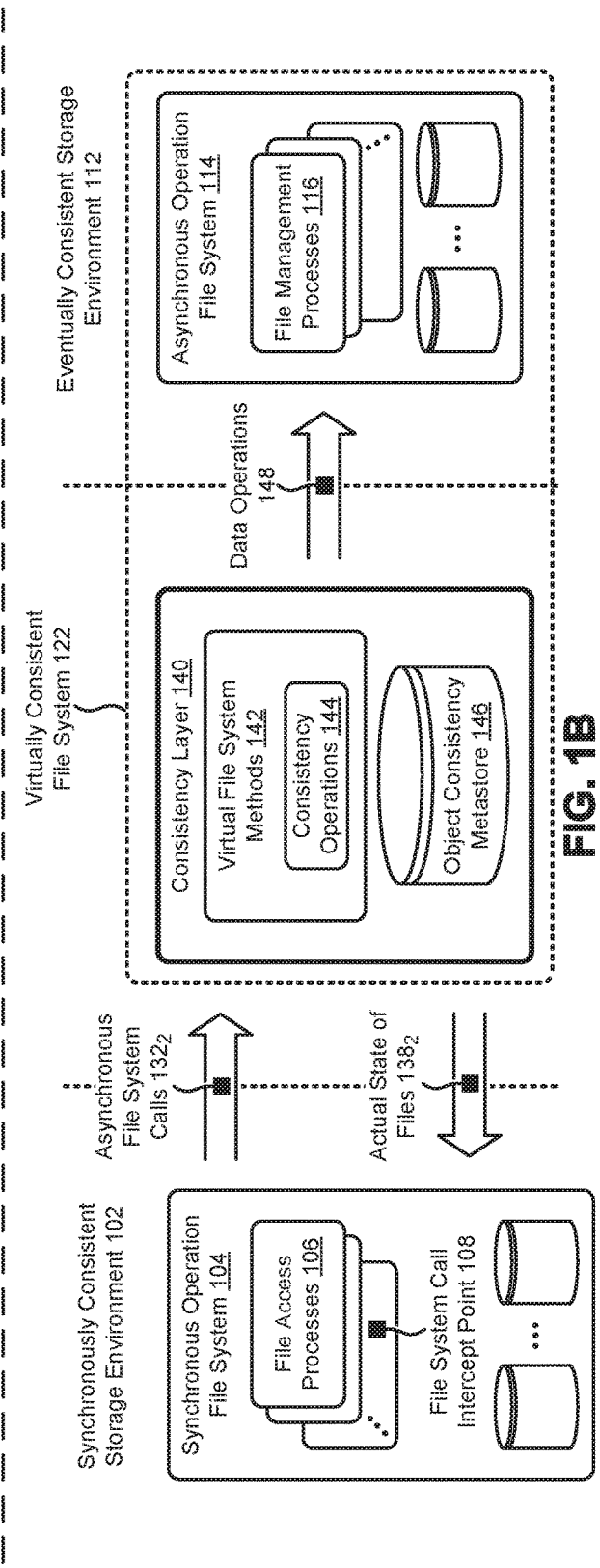

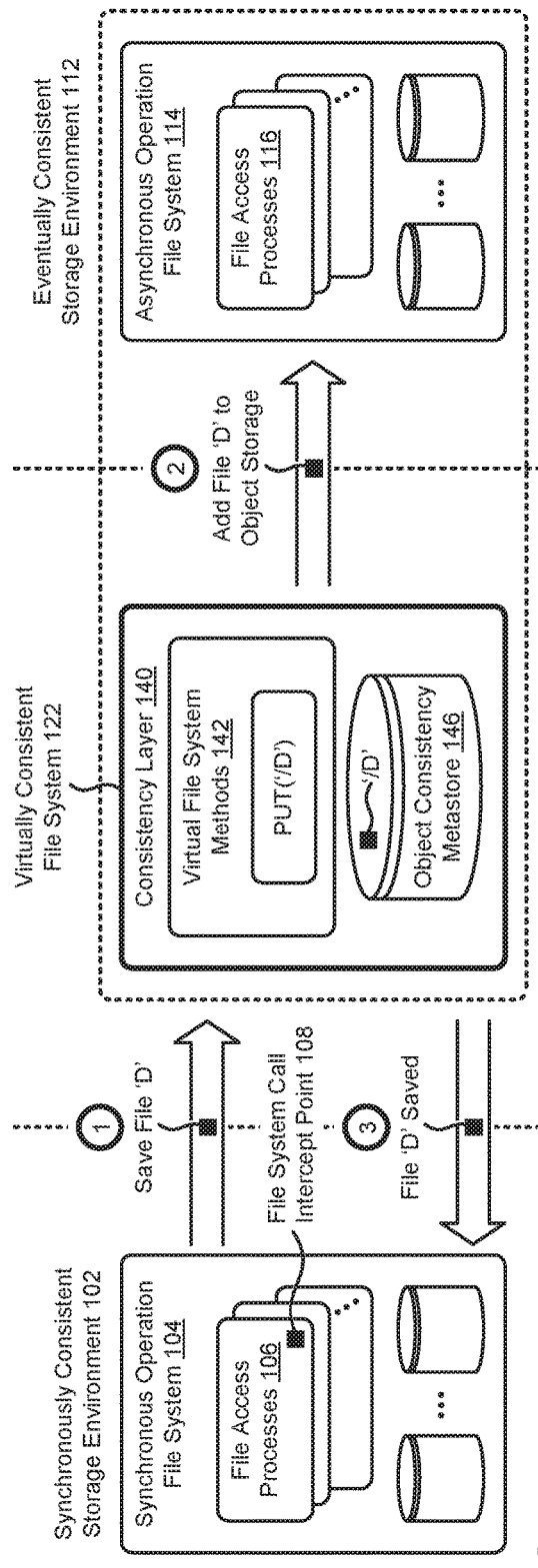
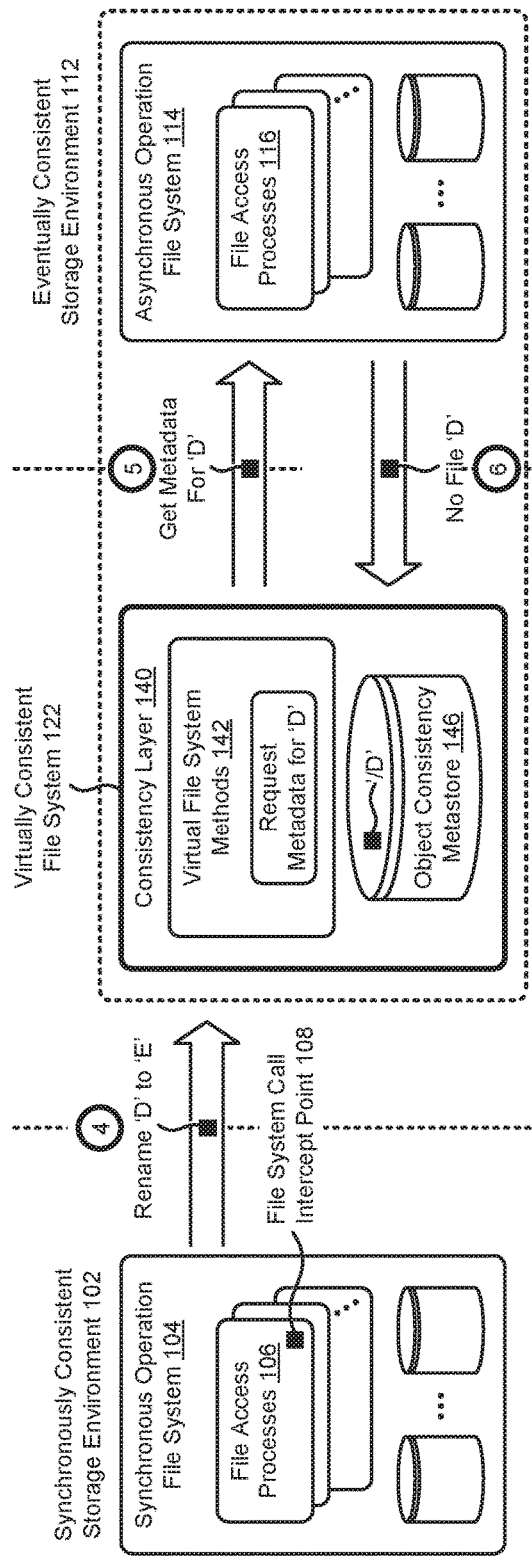
FIG. 5A
FIG. 5B

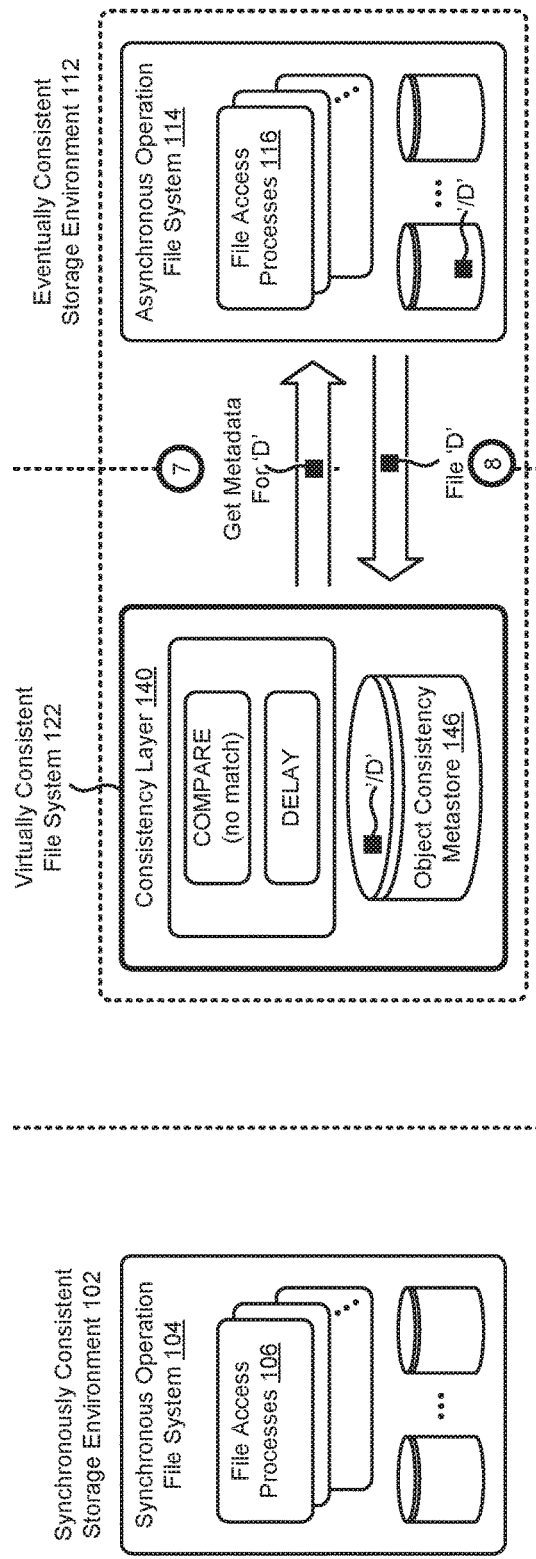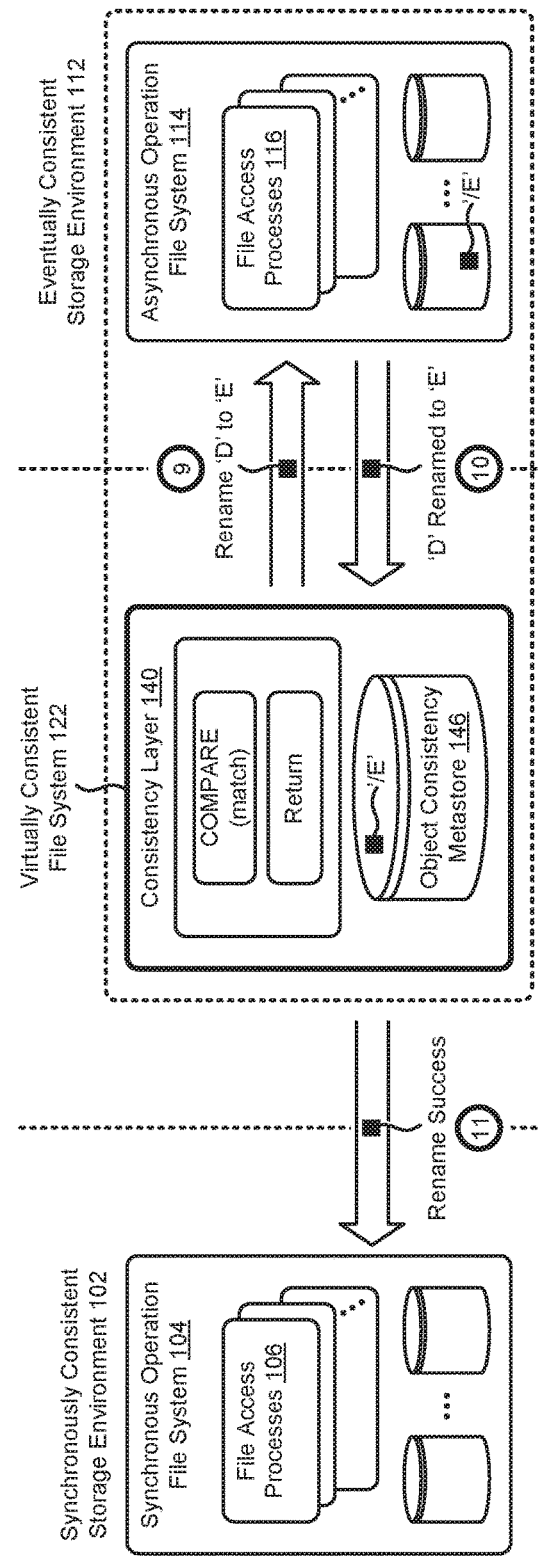

MANAGING OPERATIONS BETWEEN HETEROGENEOUS FILE SYSTEMS

CROSS-REFERENCE TO RELATED APPLICATION(S)

The present application claims the benefit of priority to U.S. Provisional Application No. 62/534,617 filed Jul. 19, 2017 and titled "MANAGING OPERATIONS BETWEEN HETEROGENEOUS FILE SYSTEMS", which is hereby incorporated by reference for all purposes in its entirety.

FIELD

This disclosure relates to managing shared content between heterogeneous file systems and more particularly to techniques for managing file operations in collaboration systems.

BACKGROUND

Today's computer-readable content objects (e.g., documents, folders, pictures, video, etc.) are often electronically stored across multiple file systems. For example, working copies of certain content objects might be stored on a file system that is local to a user device (e.g., Windows file system, MacOS file system, etc.), while backup copies of those objects might be stored on one or more external file systems using a distributed file system protocol (e.g., network file system or NFS protocol). The use of such distributed file systems has become ubiquitous for much more than content backup. For example, the use of cloud-based file systems for shared content management (e.g., availability, collaboration, etc.) continues to scale in terms of content users and content stored. These file systems can have varying characteristics in accordance with their intended use. As an example, the CAP theorem (or Brewer's theorem) states that it is impossible for a distributed data store to simultaneously provide more than two out of the following three guarantees: consistency (e.g., every read operation receives the most recent write or an error), availability (e.g., every request operation receives a response, but with no guarantee that the response reflects the most recent write), and partitioning (e.g., file system operates even in the presence of dropped (or delayed) messages between partition boundaries). For example, an enterprise's on-premise ("on-prem") storage environment might implement a file system with synchronous storage I/O operations to facilitate consistency and availability, while a cloud-based storage environment might implement asynchronous storage I/O operations to facilitate availability and partitioning but merely be "eventually consistent". In scenario that involve heterogeneous file systems, a first file system that implements synchronous storage I/O operations interacts with a second cloud-based file system that implements asynchronous storage I/O operations. In such a scenario, a write might be executed (e.g., allowed and confirmed) prior to updating the metadata associated with the write at all of the access points. Thus, a subsequent read at one of the access points that is yet to be updated will not reflect the earlier executed write.

Unfortunately, interactions between file systems that have varying characteristics (e.g., varying CAP characteristics) can result in data losses. As an example, certain content might be moved from a consistent on-prem storage environment to an eventually consistent cloud-based storage environment. Such data migration might be asynchronously invoked from the on-prem environment to a deduplication ("dedup") pipeline at the cloud-based environment that dedups the data before committing the data. In some cases, however, the dedup process at the eventually consistent cloud-based storage environment can result in unrecoverable loss of data due to the asynchrony and "eventually consistent" nature of the environment (e.g., where every read operation does not reflect the most recent write). Legacy approaches might implement a "snoop" agent (e.g., Java agent) to detect consistency issues between the consistent environment and the eventually consistent environment. Such approaches add latency to the data operations. Further, since neither environment is aware of the snooping agent, certain data operations can still be missed, which can result in data loss. For example, while a particular call might be detected by the snoop agent, other underlying operations might not be detected. These snoop agents might further miss calls from external services. Also, once implemented, such snoop agents are difficult to update (e.g., to add functionality). What is needed is a technological solution that efficiently prevents data loss when interacting with an eventually consistent storage environment.

Therefore, what is needed is a technique or techniques to improve over legacy techniques and/or over other considered approaches that prevent data loss when interacting with an eventually consistent storage environment. Some of the approaches described in this background section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

SUMMARY

The present disclosure describes techniques used in systems, methods, and in computer program products for managing operations between heterogeneous file systems, which techniques advance the relevant technologies to address technological issues with legacy approaches. More specifically, the present disclosure describes techniques used in systems, methods, and in computer program products that implement virtually consistent file systems using eventually consistent storage environments. Certain embodiments are directed to technological solutions for implementing a consistency layer that facilitates data consistency in the presence of asynchronous interactions with an eventually consistent storage environment.

One embodiment includes a method for implementing a virtual file system to provide data consistency pertaining to asynchronous interactions between heterogeneous storage systems. Such an embodiment includes operations for: receiving a file system call from a first storage environment, the file system call being issued to perform one or more data operations at a second storage environment; recording a first set of metadata in an object consistency metastore; accessing a second set of metadata from the second storage environment; comparing the first set of metadata and the second set of metadata to determine one or more comparison results; executing a time delay when there are differences between first set of metadata and the second set of metadata; and returning a response to the first storage environment. In one aspect, the file system call is structured based at least in part on one or more virtual file system methods.

In further aspects, the virtual file system methods comprise one or more write methods, one or more read methods, a put method, a delete method, a rename method, a list method, and a move method. In some aspects, the operations further comprise executing consistency operations that include at least one of, throwing an exception, manipulating the first set of metadata, issuing at least one alert, or invoking at least one of the data operations at the second storage environment.

In certain embodiments, one or more subject objects associated with the file system call are partitioned into two or more batches. In one aspect, two or more of the data operations corresponding to the two or more batches are issued to the second storage environment. In one aspect, the first storage environment is a consistent storage environment. In one aspect, the second storage environment is an eventually consistent storage environment.

Some embodiments include operations that further comprise performing a set of clean-up operations on the object consistency metastore, wherein the set of clean-up operations comprise at least one of, purging data, or performing a garbage collection operation over the object consistency metastore.

The disclosed embodiments modify and improve over legacy approaches. In particular, the herein-disclosed techniques provide technical solutions that address the technical problems attendant to preventing data loss when interacting with an eventually consistent storage environment. Such technical solutions relate to improvements in computer functionality. Various applications of the herein-disclosed improvements in computer functionality serve to reduce the demand for computer memory, reduce the demand for computer processing power, reduce network bandwidth use, and reduce the demand for inter-component communication. Some embodiments disclosed herein use techniques to improve the functioning of multiple systems within the disclosed environments, and some embodiments advance peripheral technical fields as well. As one specific example, use of the disclosed techniques and devices within the shown environments as depicted in the figures provide advances in the technical field of heterogeneous file system compatibility as well as advances in various technical fields related to data storage.

Further details of aspects, objectives, and advantages of the technological embodiments are described herein and in the drawings and claims.

BRIEF DESCRIPTION OF THE DRAWINGS

The drawings described below are for illustration purposes only. The drawings are not intended to limit the scope of the present disclosure.

FIG. 1A and FIG. 1B illustrate a computing environment in which embodiments of the present disclosure can be implemented.

FIG. 5A, FIG. 5B, FIG. 5C and FIG. 5D present usage scenarios, according to some embodiments.

DETAILED DESCRIPTION

Figure 2:
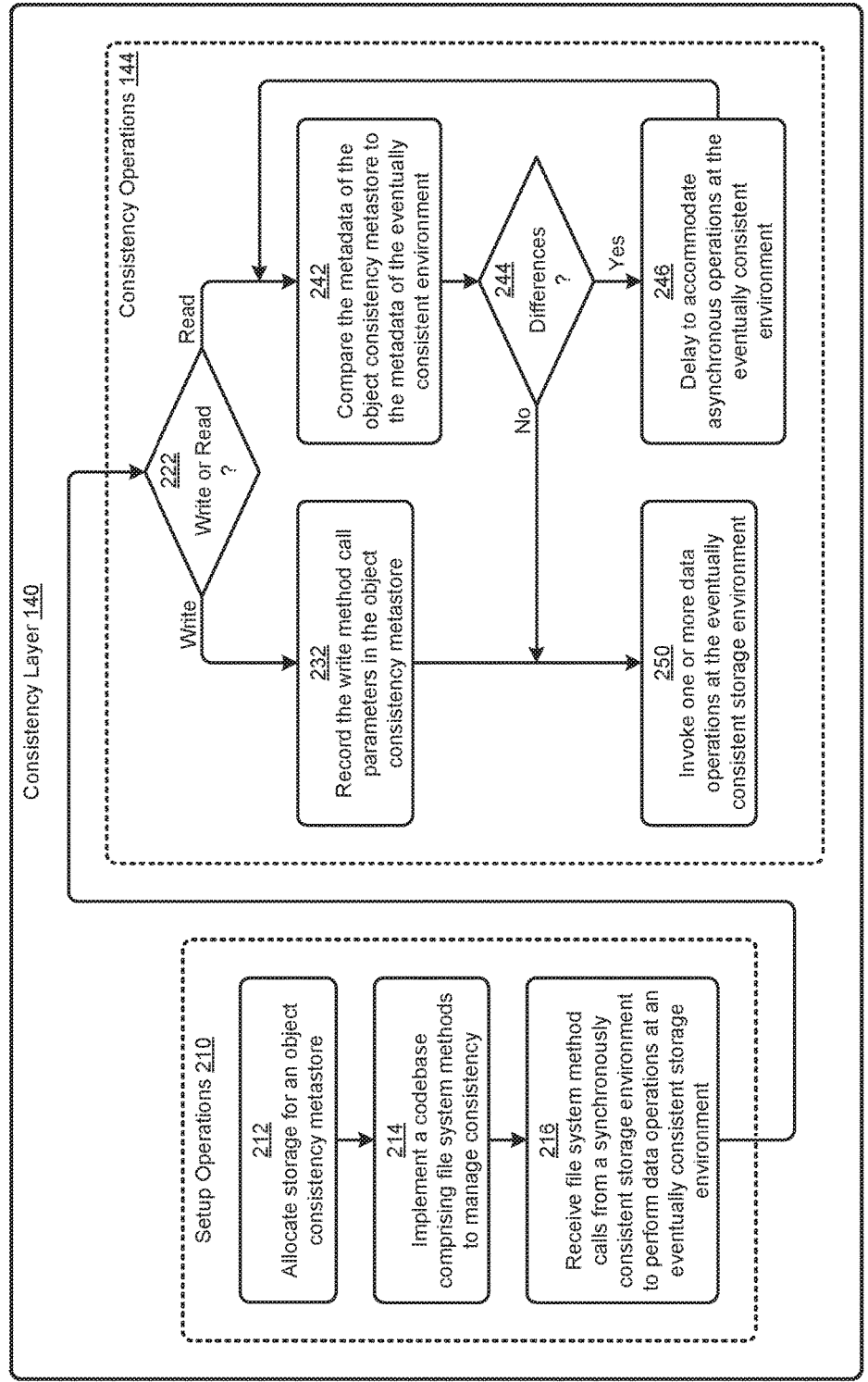
FIG. 2 presents a consistency management technique as implemented in systems that implement a virtually consistent file system in eventually consistent storage environments, in one embodiment.

Embodiments in accordance with the present disclosure address the problem of preventing data loss when interacting with an eventually consistent storage system. Some embodiments are directed to approaches for implementing a consistency layer that facilitates data consistency in the presence of asynchronous interactions between heterogeneous file systems involving an eventually consistent storage system. An eventually consistent storage system is an organization of storage devices and corresponding metadata such that a response to a storage command is provided even before the data pertaining to the storage command is saved to the storage devices and/or the metadata. An example of an eventually consistent storage system is a cloud-based storage system that provides an acknowledgement to a storage command based on a network call even before the data pertaining to the storage command is saved to the storage devices of the cloud-based storage system.

The accompanying figures and discussions herein present example environments, systems, methods, and computer program products.

OVERVIEW

Disclosed herein are techniques for implementing a consistency layer that manages the consistency of data manipulated by asynchronously issued operations that are eventually carried out in an eventually consistent storage environment. In certain embodiments, the consistency layer includes an object consistency metastore and a set of virtual file system methods that perform certain consistency operations to reconcile file system operations with the eventually consistent nature of the eventually consistent storage environment. File system calls are issued to the consistency layer. The received calls are processed by the consistency layer to represent the eventually consistent storage environment as a virtually consistent file system. Specifically, the received calls are processed by the consistency layer into one or more methods that implement consistency operations that serve to represent the eventually consistent storage environment as a virtually consistent file system. A metastore is maintained for use by the consistency operations. Calls can be processed differently based on the method type of the call. Specifically, calls issued according to write methods are recorded in the object consistency metastore and associated data operations are forwarded to the eventually consistent storage environment. Calls issued according to read methods are analyzed to reconcile consistency issues before data operations are issued to the eventually consistent storage environment. In certain embodiments, the subject objects of the received calls are intercepted and then partitioned into batches for concurrent execution of data operations for the batches. In certain embodiments, clean-up operations (e.g., purging stale data, or performing garbage collection operations) are performed at the object consistency metastore. The object consistency metastore is a set of stored values that pertain to the current state and/or desired state of objects. The object consistency metastore may further comprise storage commands (e.g., write, read) and/or file operations (e.g., put, rename) that are performed over the objects. In certain embodiments, the virtual file system methods identify and access a "source of truth". In certain embodiments, the virtual file system operations comprise a put method, a delete method, a rename method, a list method, and a move method.

Definitions and Use of Figures

Some of the terms used in this description are defined below for easy reference. The presented terms and their respective definitions are not rigidly restricted to these definitions—a term may be further defined by the term's use within this disclosure. The term "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application and the appended claims, the term "or" is intended to mean an inclusive "or" rather than an exclusive "or". That is, unless specified otherwise, or is clear from the context, "X employs A or B" is intended to mean any of the natural inclusive permutations. That is, if X employs A, X employs B, or X employs both A and B, then "X employs A or B" is satisfied under any of the foregoing instances. As used herein, at least one of A or B means at least one of A, or at least one of B, or at least one of both A and B. In other words, this phrase is disjunctive. The articles "a" and "an" as used in this application and the appended claims should generally be construed to mean "one or more" unless specified otherwise or is clear from the context to be directed to a singular form.

Various embodiments are described herein with reference to the figures. It should be noted that the figures are not necessarily drawn to scale and that elements of similar structures or functions are sometimes represented by like reference characters throughout the figures. It should also be noted that the figures are only intended to facilitate the description of the disclosed embodiments—they are not representative of an exhaustive treatment of all possible embodiments, and they are not intended to impute any limitation as to the scope of the claims. In addition, an illustrated embodiment need not portray all aspects or advantages of usage in any particular environment.

An aspect or an advantage described in conjunction with a particular embodiment is not necessarily limited to that embodiment and can be practiced in any other embodiments even if not so illustrated. References throughout this specification to "some embodiments" or "other embodiments" refer to a particular feature, structure, material or characteristic described in connection with the embodiments as being included in at least one embodiment. Thus, the appearance of the phrases "in some embodiments" or "in other embodiments" in various places throughout this specification are not necessarily referring to the same embodiment or embodiments. The disclosed embodiments are not intended to be limiting of the claims.

DESCRIPTIONS OF EXAMPLE EMBODIMENTS

FIG. 1A and FIG. 1B illustrate computing environments. As an option, one or more variations of computing environment or any aspect thereof may be implemented in the context of the architecture and functionality of the embodiments described herein.

The computing environment shown in FIG. 1A depicts a synchronous operation file system 104. The synchronous nature of the operations performed at synchronous operation file system 104 result in a synchronously consistent storage environment 102. For example, the synchronous operation file system 104 might be an "on-prem" file system that is designed to facilitate data consistency and availability. In certain cases, the synchronous operation file system 104 might want to interact with an asynchronous operation file system 114 or other storage repository that is situated in an eventually consistent storage environment 112. For example, certain data might be migrated from an on-prem file system (e.g., synchronous operation file system 104) to a cloud-based file system (e.g., asynchronous operation file system 114) to perform certain data analyses. To facilitate such a data migration process, a set of file access processes 106 at the synchronous operation file system 104 might issue asynchronous file system calls $132_1$ to various file management processes 116 at the asynchronous operation file system 114.

As earlier mentioned, however, interactions between file systems that have varying characteristics (e.g., CAP characteristics) can result in data losses. Specifically, as shown, the characteristics of the eventually consistent storage environment 112 can result in a presentation of an apparent state of files 134 to the synchronous operation file system 104 that does not reflect an actual state of files $138_1$ that will be achieved after a time lapse 136. In some cases, such a time lapse might be fractions of a second, while in other cases the time lapse might be a few hours. If any of the file access processes 106 (e.g., in a dedup pipeline) make decisions based at least in part on the apparent state of files 134, data loss can occur. For example, a content object (e.g., file) that has not been properly written to a next stage of a dedup pipeline at the eventually consistent storage environment 112 might be prematurely deleted from the pipeline (e.g., as part of a pipeline reset operation). As such, that content object is lost with no replicated copy available for recovery.

As shown in FIG. 1B, the herein disclosed techniques can address such issues pertaining to interactions between heterogeneous storage environments by implementing a consistency layer 140 to manage the consistency of data manipulated by the asynchronous file system calls $132_2$ issued from the synchronously consistent storage environment 102 to the eventually consistent storage environment 112. Any file system calls issued from the synchronously consistent storage environment can be intercepted by any process (e.g., a process within consistency layer 140) before delivery to the eventually consistent storage environment 112.

When juxtaposed as shown, the consistency layer 140 together with the asynchronous operation file system 114 serve to form a virtually consistent file system 122 that is presented to the synchronous operation file system 104 in the synchronously consistent storage environment 102. As such, an actual state of files 138$_2$ is presented to the synchronous operation file system 104 by the consistency layer 140 in accordance with the herein disclosed techniques. In the shown embodiment, the consistency layer 140 comprises certain virtual file system methods 142 that, in part, perform instances of consistency operations 144 to reconcile the asynchronous nature of the target environment (e.g., eventually consistent storage environment 112). The virtual file system methods 142 will also issue instances of data operations 148 to the asynchronous operation file system 114 to carry out the data manipulation requested in the received file system calls. As shown, the consistency layer 140 further comprises an object consistency metastore 146 to store certain metadata that facilitates performance of the consistency operations 144, and/or performance of the data operations 148, and/or performance of other operations.

In this and other embodiments, the object consistency metastore, comprises metadata that identifies an expected state of the data after execution of a data operation by the asynchronous operation file system 114. This object consistency metastore is consulted, possibly repeatedly, during execution of a particular data operation by the asynchronous operation file system 114. At some point in time, the asynchronous operation file system 114 identifies the actual state of the data at the asynchronous operation file system 114. As such, the object consistency metastore 146 serves as a repository where information pertaining to virtual file system methods 142 and/or information pertaining to consistency operations 144, and/or information pertaining to particular asynchronous file system calls 132 and/or information pertaining to asynchronous file system results, and/or information pertaining to data operations 148 can be stored for retrieval (e.g., by consistency layer 140). Strictly as an example use of the metastore, if the consistency layer issues one or more data operations 148 to "Save File Z", the expected state of the data after execution of that file save command by the asynchronous operation file system is that "File Z" is saved. At least inasmuch as the asynchronous operation file system takes some time to carry out operations pertaining to the "Save File Z" command, it can happen that a next data operation at a moment later to retrieve the contents of "File Z" from the asynchronous operation file system would return a "File Not Found" indication. However, the results from the asynchronous operation file system can be checked against the object consistency metastore to check if the expected state of the data matches the actual state as reported by asynchronous operation file system. As such, if the expected state of "File Z" as given in the object consistency metastore indicates that "File Z" is saved, but the asynchronous operation file system returns a "File Not Found" indication, then the consistency layer 140 can wait for the asynchronous operation file system to complete the save operations pertaining to "File Z".

One or some or all of the file access processes 106 at the synchronous operation file system 104 include at least one intercept point (e.g., a file system call intercept point 108) from which intercept point any system calls can be intercepted and forwarded to the consistency layer 140 before being communicated to the asynchronous operation file system 114.

The foregoing discussion of FIG. 1A and FIG. 1B includes certain operations that are performed at the consistency layer 140, which are disclosed in further detail as follows.

FIG. 2 presents a consistency management technique 200 as implemented in systems that implement a virtually consistent file system in eventually consistent storage environments. As an option, one or more variations of consistency management technique 200 or any aspect thereof may be implemented in the context of the architecture and functionality of the embodiments described herein. The consistency management technique 200 or any aspect thereof may be implemented in any environment.

The consistency management technique 200 presents one embodiment of certain steps and/or operations that facilitate managing interactions between heterogeneous storage environments. As shown, the steps and/or operations can be grouped in a set of setup operations 210 and a set of consistency operations 144. In certain embodiments, the setup operations 210 and/or the consistency operations 144 might be performed at the consistency layer 140 earlier described. As illustrated, the setup operations 210 of the consistency management technique 200 can commence by allocating storage for an object consistency metastore (step 212). A codebase comprising certain virtual file system methods to manage data consistency is implemented (step 214). Further, file system method calls from a synchronously consistent storage environment to perform data operations at an eventually consistent storage environment are received (step 216).

The consistency operations 144 of the consistency management technique 200 can commence by detecting whether a received call is associated with a write method or a read method (decision 222). If the received call is a write method call (see "Write" path of decision 222), certain parameters associated with the write method call are recorded in the object consistency metastore (step 232). One or more data operations pertaining to the write method call are invoked at the eventually consistent storage environment (step 250). If the received call is a read method call (see "Read" path of decision 222), the metadata of the object consistency metastore is compared to the metadata from the eventually consistent storage environment (step 242). If there are differences between the compared metadata (see "Yes" path of decision 244), a delay is invoked to accommodate asynchronous operations that might be in process at the eventually consistent storage environment (step 246). For example, the delay might accommodate a previously issued write operation that was recorded in the object consistency metastore but has not completed at the eventually consistent storage environment so as to be written to the metadata in that environment. At the conclusion of the delay, the metadata comparison (step 242) is repeated. When there are no differences between the two sets of metadata (see "No" path of decision 244), one or more data operations pertaining to the read method call are invoked at the eventually consistent storage environment (step 250).

The foregoing embodiment is merely one illustrative embodiment. Many variations are possible. Strictly as one example, any of a set of one or more data operations or other acts that are to be performed by or within the eventually consistent storage environment (e.g., operations for performance of step 250) can be invoked at any time after receiving the file system method calls from the synchronously consistent storage environment (e.g., operations resulting from performance of step 216). In some such cases, the aggregate latency involved in making multiple calls to the eventually consistent storage environment (e.g., latencies pertaining to the operations of step 250 and latencies pertaining to the operations of step 242) can be reduced by invoking operations that have the longer or longest expected latencies in advance of invoking operations that have the shorter or shortest expected latencies.

In addition to performance improvements (e.g., reduced latencies) of the foregoing embodiment, additional performance improvements and/or reduction of computing resources consumed can be gained by batching data operations that are to be performed by the eventually consistent storage environment together with metadata fetching operations that are to be performed by the eventually consistent storage environment. As a result of batching the data operations together with the metadata fetching operations, only one network call needs to be raised to the eventually consistent storage environment, rather than the two separate network calls as would be the case if the operations were not batched. The metadata fetch operation, whether in a batch, or whether invoked singly can be performed any time prior to the metadata comparison of step 242.

The foregoing discussion of FIG. 2 describes various write method calls and read method calls which are disclosed in further detail as follows.

Figure 3A:
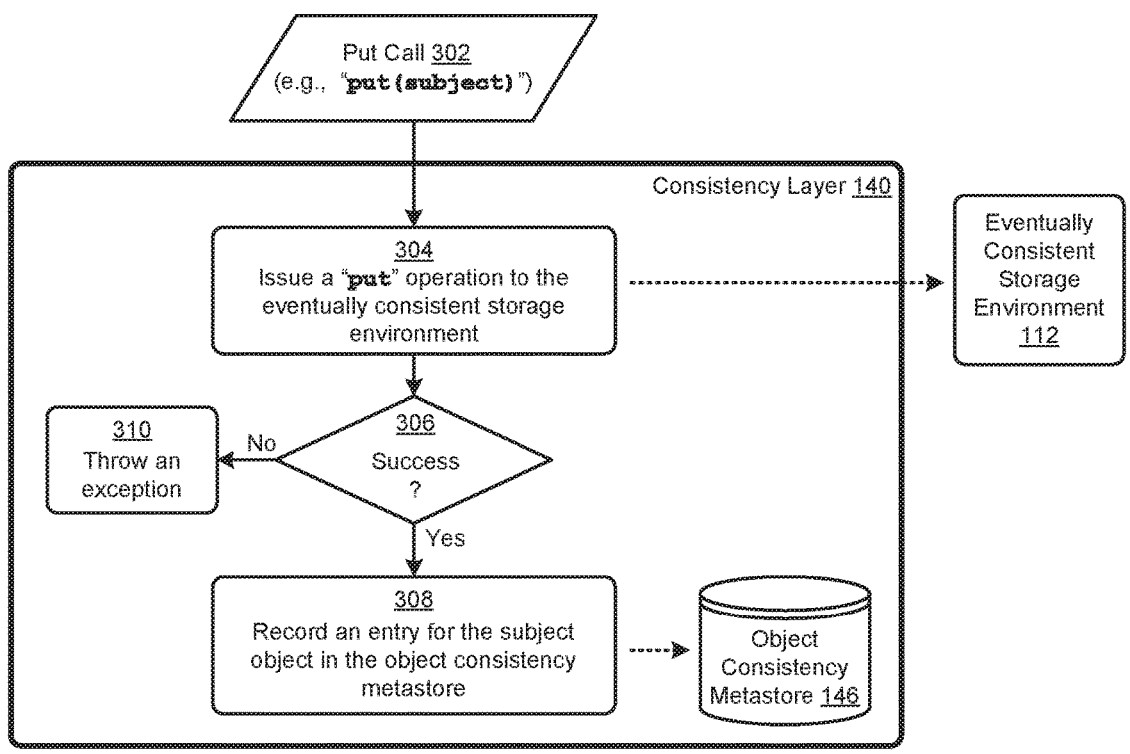
FIG. 3A depicts an object write technique as used in systems that implement a virtually consistent file system in eventually consistent storage environments, in one embodiment.

FIG. 3A depicts an object write technique 3A00 as used in systems that implement a virtually consistent file system in eventually consistent storage environments. As an option, one or more variations of object write technique 3A00 or any aspect thereof may be implemented in the context of the architecture and functionality of the embodiments described herein. The object write technique 3A00 or any aspect thereof may be implemented in any environment.

The object write technique 3A00 presents one embodiment of certain steps and/or operations that facilitate writing a content object to an eventually consistent storage environment, according to the herein disclosed techniques. In certain embodiments, the object write technique 3A00 might be performed at the consistency layer 140 earlier described. As illustrated, the object write technique 3A00 can be invoked by a put call 302 (e.g., a "put (subject))" file system method call issued from a synchronously consistent storage environment) received at the consistency layer 140. Upon receiving the put call 302, a corresponding "put" operation is issued to the eventually consistent storage environment (e.g., eventually consistent storage environment 112) (step 304). When the "put" operation is successful (see "Yes" path of decision 306), an entry corresponding to the subject object (e.g., "subject") of the put call 302 is recorded in the object consistency metastore (e.g., object consistency metastore 146) (step 308). If the "put" operation at the eventually consistent storage environment is not successful (see "No" path of decision 306), an exception is thrown (step 310).

An example set of pseudo code for carrying out the put operation is shown in the table below.

TABLE 1

Object Write Pseudo Code

| Line | Pseudo Code |
|------|-------------|
| 01 | put (a/b/c) |
| 02 | { |
| 03 | target.add(a/b/c) |
| 04 | if operation successful |
| 05 | metastore.add(a/b/c) |
| 06 | else |
| 07 | throw exception |
| 08 | } |

Figure 3B:
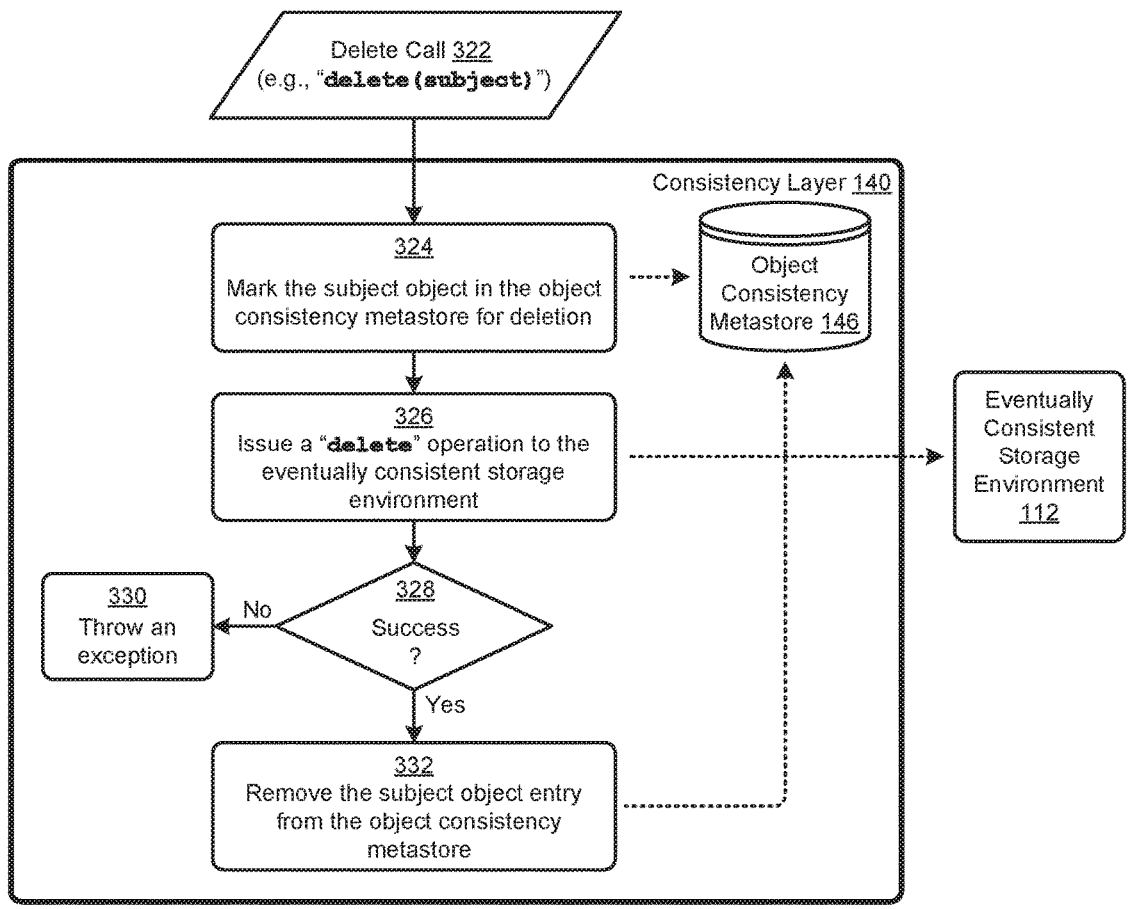
FIG. 3B presents an object delete technique as used in systems that implement a virtually consistent file system in eventually consistent storage environments, in one embodiment.

FIG. 3B presents an object delete technique 3B00 as used in systems that implement a virtually consistent file system in eventually consistent storage environments. As an option, one or more variations of object delete technique 3B00 or any aspect thereof may be implemented in the context of the architecture and functionality of the embodiments described herein. The object delete technique 3B00 or any aspect thereof may be implemented in any environment.

The object delete technique 3B00 presents one embodiment of certain steps and/or operations that facilitate deleting a content object at an eventually consistent storage environments, according to the herein disclosed techniques. In certain embodiments, the object delete technique 3B00 might be performed at the consistency layer 140 earlier described. As illustrated, the object delete technique 3B00 can be invoked by a delete call 322 (e.g., a "delete (subject)" file system method call issued from a synchronously consistent storage environment) received at the consistency layer 140. Upon receiving the delete call 322, the subject object (e.g., "subject") of the delete call 322 is marked for deletion in the object consistency metastore (e.g., object consistency metastore 146) (step 324). A "delete" operation is issued to the eventually consistent storage environment (step 326). When the "delete" operation is successful (see "Yes" path of decision 328), the entry associated with the subject object in the object consistency metastore is removed (step 332). If the "delete" operation at the eventually consistent storage environment is not successful (see "No" path of decision 328), an exception is thrown (step 330).

An example set of pseudo code for carrying out the delete operation is shown in the table below.

TABLE 2

Object Delete Pseudo Code

| Line | Pseudo Code |
|------|-------------|
| 01 | delete (a/b/c) |
| 02 | { |
| 03 | metastore.markDelete(a/b/c) |
| 04 | target.delete(a/b/c) |
| 05 | if deleted at target: metastore.delete(a/b/c) |
| 06 | } |

Figure 3C:
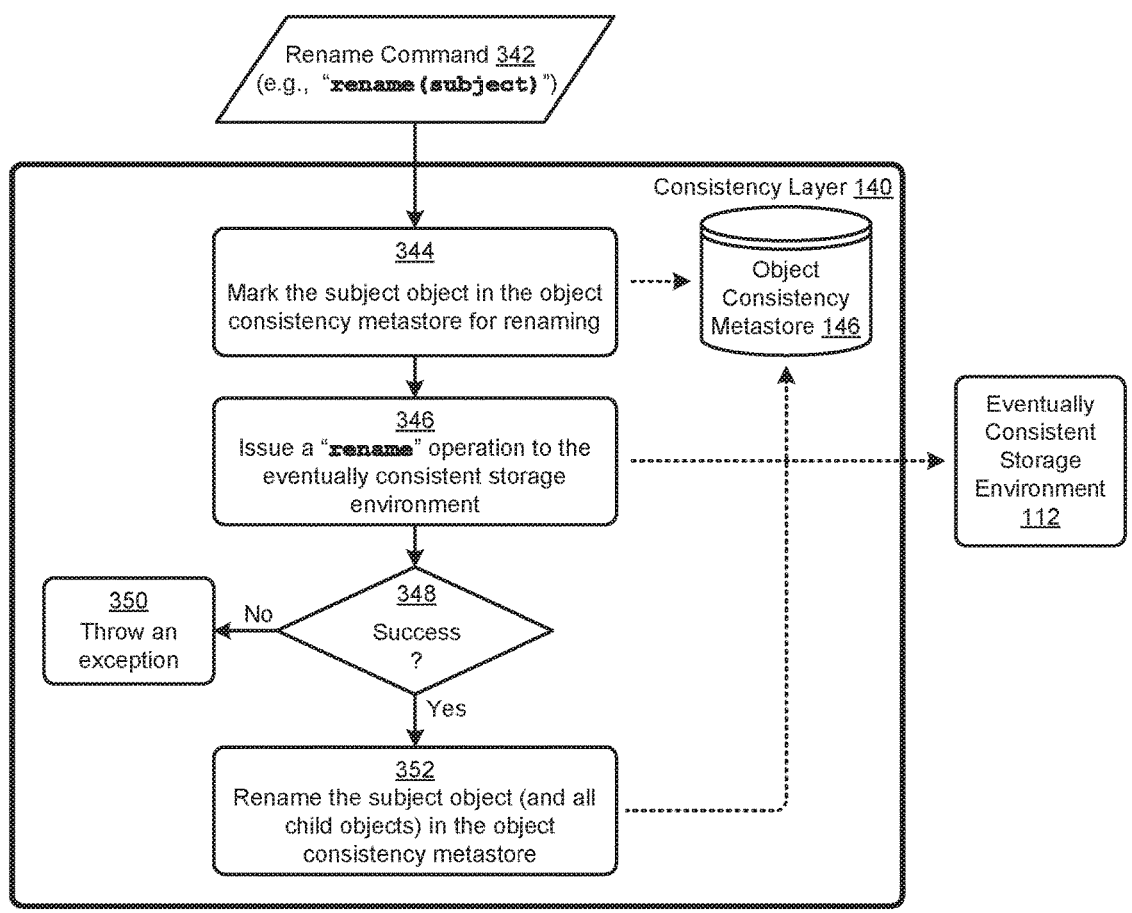
FIG. 3C depicts an object rename technique as used in systems that implement a virtually consistent file system in eventually consistent storage environments, in one embodiment.

FIG. 3C depicts an object rename technique 3C00 as used in systems that implement a virtually consistent file system in eventually consistent storage environments. As an option, one or more variations of object rename technique 3C00 or any aspect thereof may be implemented in the context of the architecture and functionality of the embodiments described herein. The object rename technique 3C00 or any aspect thereof may be implemented in any environment.

The object rename technique 3C00 presents one embodiment of certain steps and/or operations that facilitate renaming a content object at an eventually consistent storage environments, according to the herein disclosed techniques. In certain embodiments, the object rename technique 3C00 might be performed at the consistency layer 140 earlier described. As illustrated, the object rename technique 3C00 can be invoked by a rename call 342 (e.g., a "rename (subject)" file system method call issued from a synchronously consistent storage environment) received at the consistency layer 140. Upon receiving the rename call 342, the subject object (e.g., "subject") of the rename call 342 is marked for renaming in the object consistency metastore (e.g., object consistency metastore 146) (step 344). A "rename" operation is issued to the eventually consistent storage environment (e.g., eventually consistent storage environment 112) (step 346). When the "rename" operation is successful (see "Yes" path of decision 348), the subject object (and all its child objects) in the object consistency metastore is renamed (step 352). If the "rename" operation at the eventually consistent storage environment is not successful (see "No" path of decision 348), an exception is thrown (step 350).

An example set of pseudo code for carrying out the rename operation is shown in the table below.

TABLE 3

Object Rename Pseudo Code

| Line | Pseudo Code |
|------|-------------|
| 01 | rename (/a/b,/a/c) |
| 02 | { |
| 03 | metastore.markRename(/a/b) |
| 04 | target.rename(/a/b,/a/c) |
| 05 | if renamed at target: metastore.rename(/a/b,/a/c) |
| 06 | } |

Figure 4A:
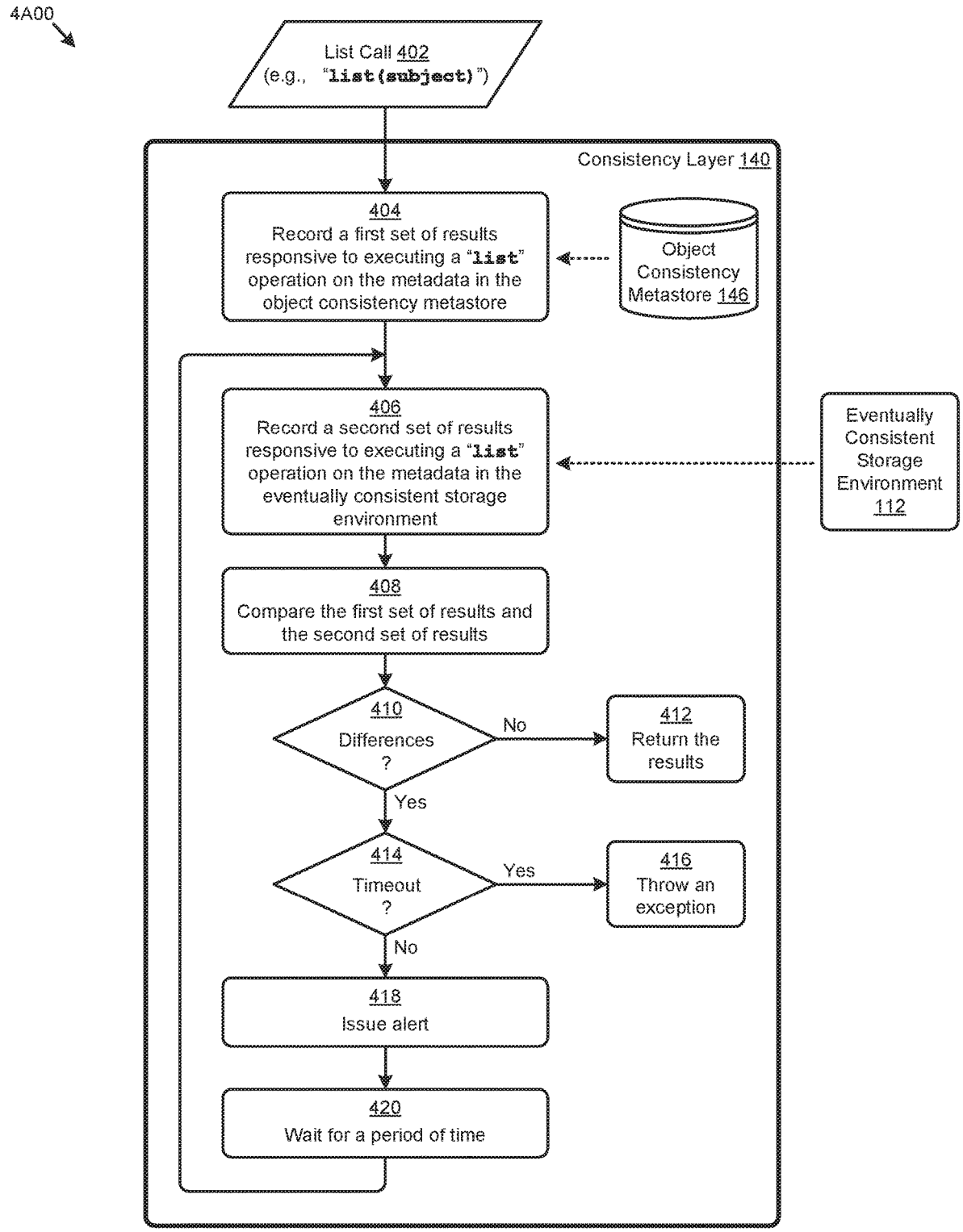
FIG. 4A depicts an object list technique as used in systems that implement a virtually consistent file system in eventually consistent storage environments, in one embodiment.

FIG. 4A depicts an object list technique 4A00 as used in systems that implement a virtually consistent file system in eventually consistent storage environments. As an option, one or more variations of object list technique 4A00 or any aspect thereof may be implemented in the context of the architecture and functionality of the embodiments described herein. The object list technique 4A00 or any aspect thereof may be implemented in any environment.

The object list technique 4A00 presents one embodiment of certain steps and/or operations that facilitate obtaining a correct (e.g., consistent) list of content objects stored at eventually consistent storage environments, according to the herein disclosed techniques. In certain embodiments, the object list technique 4A00 might be performed at the consistency layer 140 earlier described. As illustrated, the object list technique 4A00 can be invoked by a list call 402 (e.g., a "list (subject)" file system method call issued from a synchronously consistent storage environment) received at the consistency layer 140. Upon receiving the list call 402, a first set of results responsive to executing a "list" operation on the metadata in the object consistency metastore (e.g., object consistency metastore 146) is recorded (step 404). A second set of results responsive to executing a "list" operation on the metadata in the eventually consistent storage environment (e.g., eventually consistent storage environment 112) is also recorded (step 406). The first set of results and the second set of results are compared (step 408). If there are no differences (see "No" path of decision 410), then the results (e.g., from either set) is returned (step 412). If there are differences (see "Yes" path of decision 410) and a timeout threshold (e.g., 2 hours) has not been breached (see "No" path of decision 414), an alert is issued (step 418) and a wait for a certain time period is performed (step 420). When the time period has passed, a new instance of the results from the eventually consistent storage environment is obtained (step 406) and compared to the object consistency metadata (step 408). This comparison process is repeated until no differences are found or a timeout has occurred. If a timeout has occurred (see "Yes" path of decision 414) an exception is thrown (step 416).

An example set of pseudo code for carrying out an embodiment of the object list technique 4A00 is shown in the table below.

TABLE 4

Object List Pseudo Code

| Line | Pseudo Code |
|------|-------------|
| 01 | list (/a/b) |
| 02 | { |
| 03 | list1=metastore.list(/a/b) |
| 04 | list2=target.list(/a/b) |
| 05 | list1.diff(list2) |
| 06 | if difference: |
| 07 | timeout exceeded: throwException |
| 08 | alert( ) |
| 09 | wait( ) then goto step 04 |
| 10 | else return list2 |
| 11 | } |

Figure 4B:
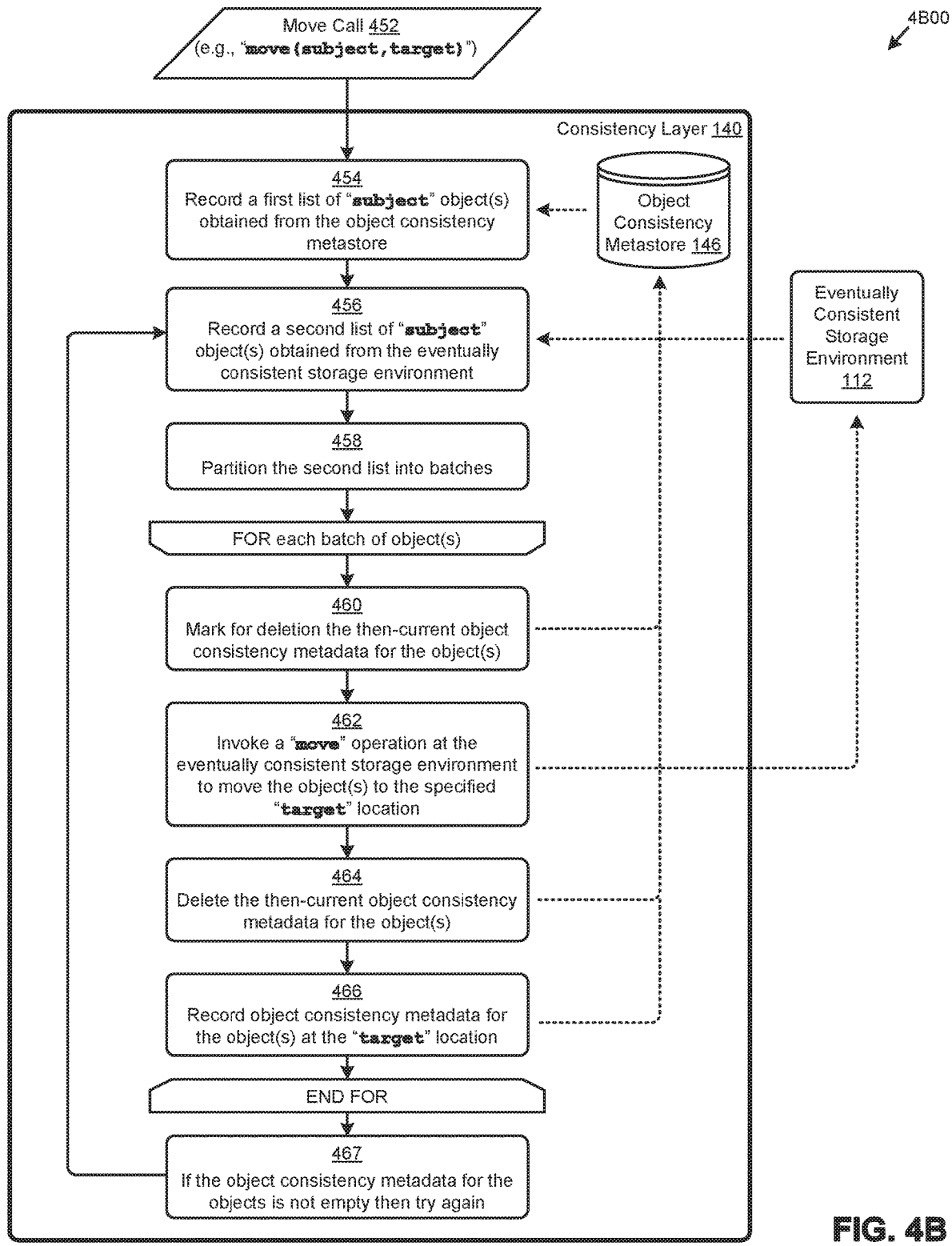
FIG. 4B presents an object move technique as used in systems that implement a virtually consistent file system in eventually consistent storage environments, in one embodiment.

FIG. 4B presents an object move technique 4B00 as used in systems that implement a virtually consistent file system in eventually consistent storage environments. As an option, one or more variations of object move technique 4B00 or any aspect thereof may be implemented in the context of the architecture and functionality of the embodiments described herein. The object move technique 4B00 or any aspect thereof may be implemented in any environment.

The object move technique 4B00 presents one embodiment of certain steps and/or operations that facilitate moving one or more content objects at eventually consistent storage environments, according to the herein disclosed techniques. In certain embodiments, the object move technique 4B00 might be performed at the consistency layer 140 earlier described. As illustrated, the object move technique 4B00 can be invoked by a move call 452 (e.g., a "move (subject, target)" file system method call issued from a synchronously consistent storage environment) received at the consistency layer 140. Upon receiving the move call 452, a first list of "subject" objects obtained from the object consistency metastore (e.g., object consistency metastore 146) is recorded (step 454). A second list of "subject" objects obtained from the eventually consistent storage environment (e.g., eventually consistent storage environment 112) is also recorded (step 456). In certain embodiments, the second list of objects is partitioned into batches (step 458). For example, such partitioning can improve the efficiency of operations at the consistency layer 140 and/or the eventually consistent storage environment 112.

For each batch of objects, the then-current object consistency metadata associated with the objects are marked for deletion (step 460). A "move" operation is invoked at the eventually consistent storage environment to move the objects to the specified "target" location (step 462). The then-current object consistency metadata associated with the objects is then deleted (step 464), and entries for the objects at the "target" location are recorded in the object consistency metastore (step 466). After completing the for loop, then at step 467, check to confirm that the object consistency metadata for the objects is empty, indicating that all elements of all batches have been processed. If all elements of all batches have not (yet) been processed (e.g., the list comprising the processing state of the then-current object consistency metadata associated with the objects is not empty) then execute a time delay (e.g., a backoff delay) and try again.

An example set of pseudo code for carrying out an embodiment of the object move technique 4B00 is shown in the table below.

TABLE 5

Object List Pseudo Code

| Line | Pseudo Code |
|---|---|
| 01 | move (/a/b,/a/c) |
| 02 | { |
| 03 |    mlist=metastore.list(/a/b) |
| 04 |    target.list(/a/b,batch) |
| 05 |    foreach batchX |
| 06 |       metastore.markDelete(batchX) |
| 07 |       target.move(batchX, /a/c) |
| 08 |       metastore.add(batchX, /a/c) |
| 09 |       metastore.delete(batchX) |
| 10 |       mlist=mlist−batchX |
| 11 |    endfor |
| 12 |    if mlist<>0 backoff for a time period and try again from step 4 |
| 13 | } |

The foregoing virtual file system methods are strictly examples. Other virtual file system methods by other names and with varying scopes of functionality are possible. Strictly as examples, Table 5 presents additional or alternative virtual file system methods.

TABLE 5

Example Virtual File System Methods

| Call Name | Synopsis |
|---|---|
| initialize DBClient | Call at initialization time.<br>A. Check if metastore table exists and is active in the database.<br>B. If table does not exist we log an error, push an alert and disable tracking to prevent calls against a nonexistent metastore.<br>C. If any of the above steps fail, appropriate exceptions will be thrown and logged in the alert log. |
| create | This function is called during a put operation.<br>A. Create a new entry at the indicated path and return an output stream to which the data is written.<br>B. Write an entry for the given path and file to the database along with a timestamp.<br>C. Write the second entry based on timestamp as key.<br>D. Each database write can be retried for a specified number of times in case of timeouts with exponential backoff. This allows for recovery in case the DBClient was briefly unresponsive. If we run out of retries or the write fails due to some other reason, appropriate exceptions will be thrown and logged in the alert log. |
| mkdirs | This file system call is used to create a directory and any nonexistent parent directories.<br>A. If the mkdirs method succeeds and returns true (indicating all directories were successfully created), then write the entry in database and the corresponding timestamp. In this case the isDirectory flag is also set.<br>B. The timeout recovery mechanism uses backoff.<br>C. Other failures will result in appropriate exceptions being thrown and logged in an alert log. |
| recursiveDelete | This method is called when a file system issues deletes such as rm, rmdir etc that are intended to take place on the eventually consistent file system. If a recursive flag is specified this method can also trigger recursive deletes. The method returns true if all objects were successfully deleted.<br>A. Mark the item being deleted in the metastore (isDeleted = 1). If the entry does not exist, database creates a new entry.<br>B. If this is a recursive delete, fetch all items to be deleted.<br>C. Call the delete method.<br>D. If the above call succeeds, update the metastore to mark all relevant objects as deleted. The corresponding timestamp for the object(s) is also updated.<br>E. This two-step marking method helps to identify cases where delete was attempted but for some reason it could not be completed.<br>F. This function implements a timeout recovery mechanism with backoff.<br>G. Other failures will result in appropriate exceptions being thrown and logged in the alert log. |
| listStatus | This method is called every time a filesystem list( ) is called. The core consistency check logic is implemented as a part of this call. Below are the actions performed as a part of this call in specified order:<br>A. Call a method that returns an array of FileStatus objects in the provided path.<br>B. If the above call succeeds and returns a nonempty list of objects then execute a query on the same path on the database metastore.<br>C. Then diff the list returned by eventually-consistent file system with the metastore list. If there are objects present in the metastore list which are not present in eventually-consistent file system then we have a possible consistency issue. In this case, we attempt to refetch the list from eventually-consistent file system by calling a listStatus method after a specified amount of delay. |

TABLE 5-continued

Example Virtual File System Methods

| Call Name | Synopsis |
|---|---|
| | D. Log in the alert log that a consistency issue was encountered.<br>E. If the next list is consistent with the metastore then log the successful recovery from eventual consistency and return the eventually-consistent file system list. If not then based on remaining retries try to refetch again after the specified delay. If there remain no retries and still consistency is not achieved then push an alert and throw a consistency exception or continue with the inconsistent list based on the specified configuration.<br>F. If there are objects present in eventually-consistent file system which are not in the metastore we ignore them as they may be stale.<br>G. Objects that are no longer tracked in the metastore or objects added directly to the eventually consistent file system.<br>H. In case there are objects that are marked deleted in the metastore but present in the eventually consistent file system metastore then this indicates a possible delete consistency issue. In this case, trust the metastore and remove the object from the list returned back.<br>I. Any other failures will result in appropriate exceptions being thrown and logged in an alert log. |

Figure 4C:
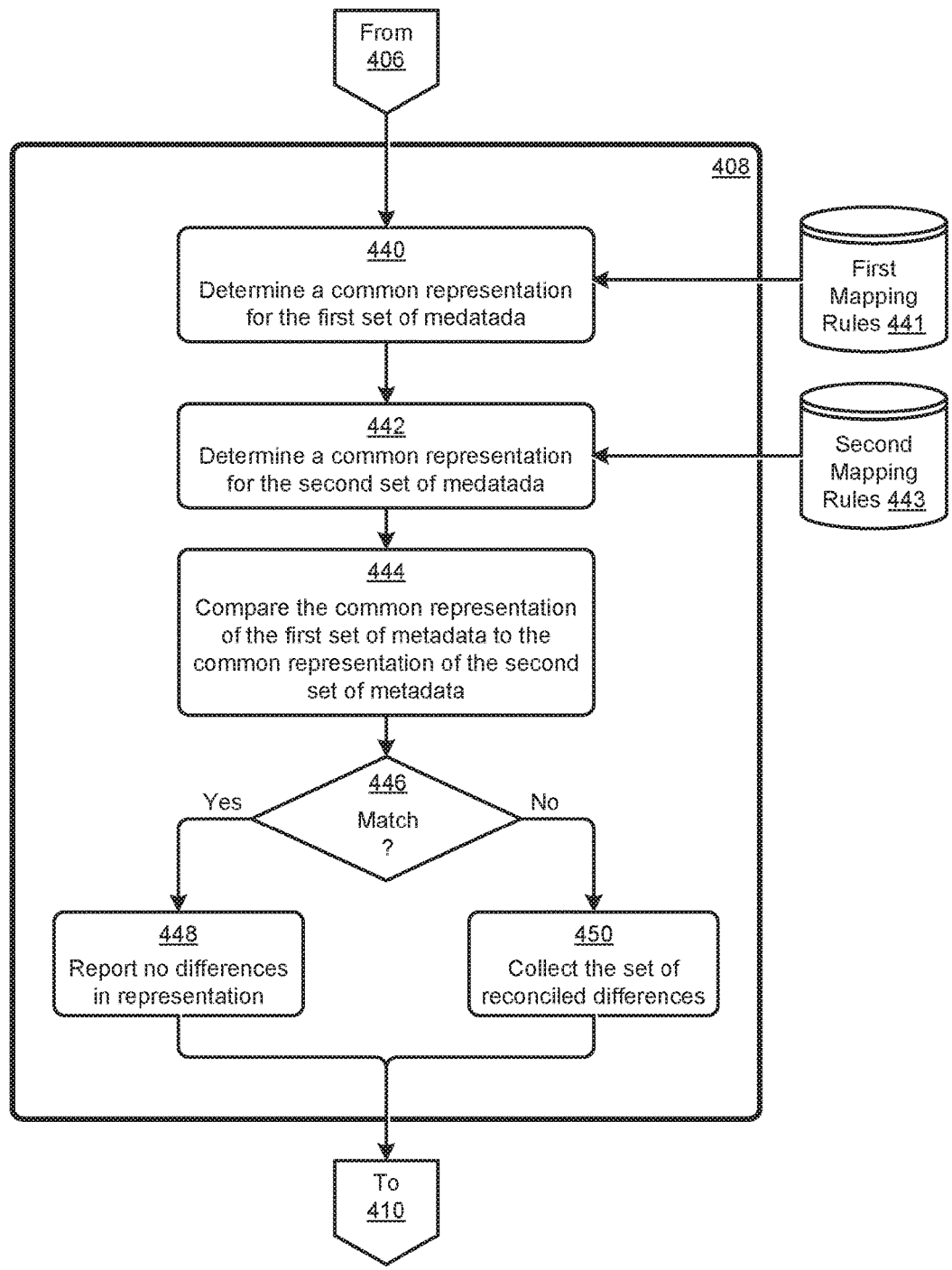
FIG. 4C depicts a difference detection subroutine, according to some embodiments.

FIG. 4C depicts a difference detection subroutine 4C00. The flow implements aspects of the foregoing step 408. As shown, results from the eventually consistent storage environment had been obtained (e.g., from step 406) and stored in a first set of metadata. Step 440 serves to apply mapping rules to the representation in the first set of metadata so as to codify the first set of metadata in a common representation that is also used for representing metadata from the second set of metadata (at step 442). In some cases, the syntax and semantics of the first set of metadata differs from the syntax and semantics of the second set of metadata. In such cases, a set of first mapping rules 441 are applied to the first set of metadata to achieve a common representation form, and a set of second mapping rules 443 are applied to the second set of metadata to achieve a common representation form for comparisons.

Having a common representation for both sets of metadata, step 444 facilitates comparison of those two sets to determine if there are differences, or if they match. If they match (decision 446) then step 448 reports no differences. Otherwise, a set of differences are collected at step 450, and returned to the caller.

FIG. 5A, FIG. 5B, FIG. 5C and FIG. 5D present usage scenarios. FIG. 5A depicts a portion of a flow where a file access process 106 issues a command to "Save file T" (operation 1). The consistency layer 140 in turn issues a command to the eventually consistent file system to "Add file 'D' to object storage" (at operation 2). At operation 3, the file access process 106 that issued the command to "Save file 'D'" receives a confirmation in the form of "File 'D' saved". Such an indication of "File 'D' saved" is returned prospectively under the assumption that file 'D' will be eventually saved by the eventually consistent file system.

However, it can happen that in the time window that occurs between the time that the command "Add file 'D' to object storage" of operation 2 is consumed by the eventually consistent file system and the time that the eventually consistent file system actually carries out is steps to "Add file 'D' to object storage", that a command of some sort that refers to file 'D' is issued. In such a case it is possible that the processing of the command that refers to file 'D' at the eventually consistent file system would raise an error (e.g., since file 'D' had not yet been saved into the object store of the eventually consistent file system). Aspects of such a scenario is shown and described in FIG. 5B. Specifically, a rename command to "Rename 'D' to 'E'" (that is, a command that refers to file 'D') is issued (at operation 4) by the synchronous operation file system. The consistency layer 140 gets metadata from the eventually consistent file system (at operation 5). In this example, the occurrence of the command to "Rename 'D' to 'E'" comes within the aforementioned time window. Accordingly, the eventually consistent file system returns an error indication (at operation 6) that file 'D' does not exist. This sets up the scenario where the consistency layer 140 intercedes so as to process the error indication that file 'D' does not exist by (1) comparing metadata or otherwise recognizing the difference between the object consistency metastore and the metastore of the eventually consistent file system. Since there is a difference, then (2) introducing a delay to allow the eventually consistent file system to complete the 'save' of file 'D' and to allow the eventually consistent file system to update its metastore with an indication of the existence of file 'D' (e.g., as shown in the following FIG. 5C). After the delay, the request for metadata is reissued (at operation 7) to the eventually consistent file system. In many embodiments, the eventually consistent file system exhibits idempotent behaviors, such that a command can be issued multiple times.

At some point in time, the eventually consistent file system will have stored the file (as shown in operation 8 of FIG. 5C), and thus the eventually consistent file system will be able to perform a "Rename 'D'" to 'E'" command. Such a command to "Rename 'D' to 'E'" is shown in FIG. 5D. The eventually consistent file system receives the command to "Rename 'D' to 'E'" command (at operation 9) and returns an indication (at operation 10) that 'D' was successfully renamed to 'E'. The metadata at the eventually consistent file system is accordingly updated such that when compare operations are again performed, there will be a match (as shown), and a file rename success indication is returned to the caller (operation 11) by the consistency layer 140.

Additional Embodiments of the Disclosure

Additional Practical Application Examples

Figure 6:
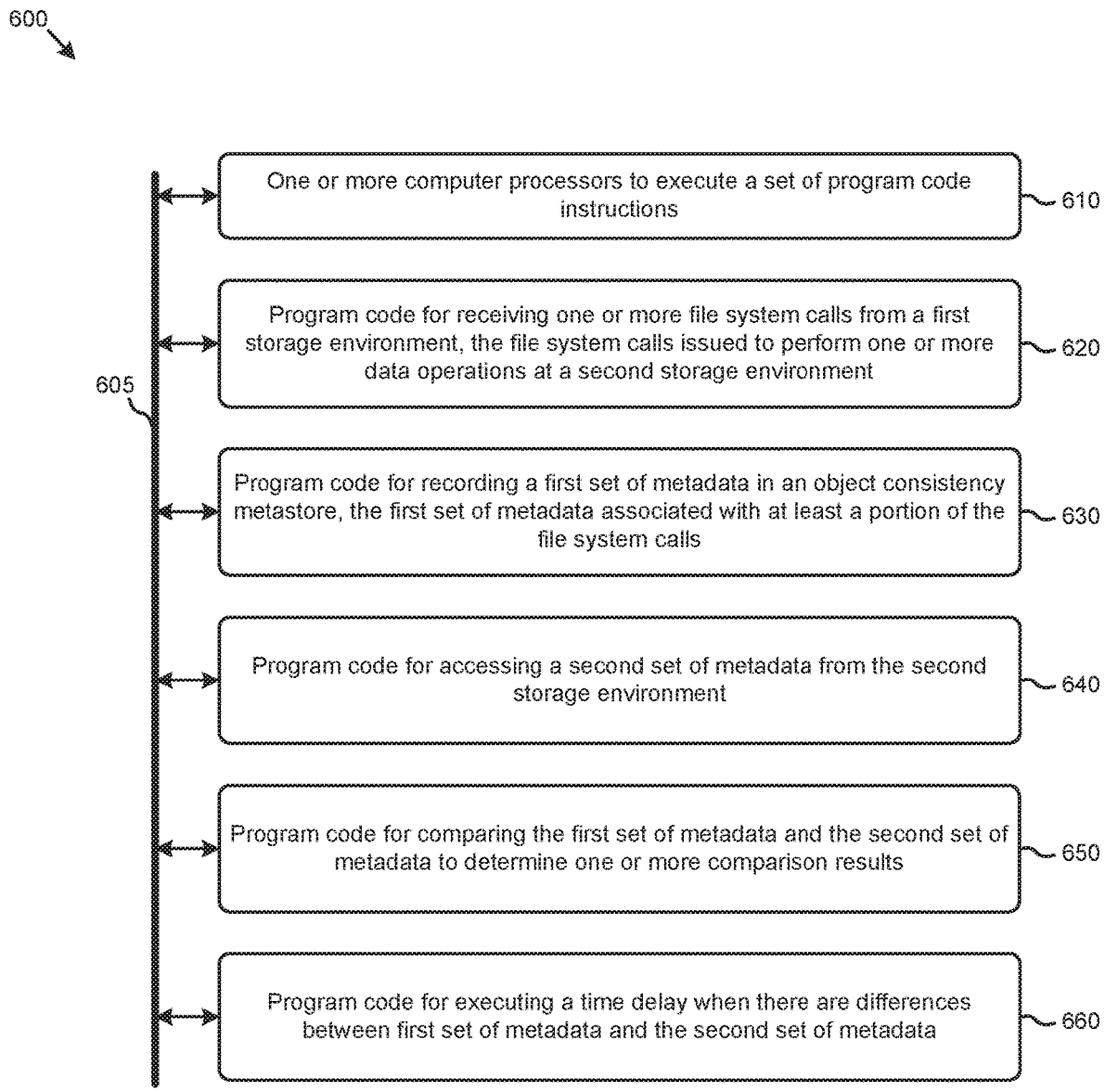
FIG. 6 depicts system components as arrangements of computing modules that are interconnected so as to implement certain of the herein-disclosed embodiments.

FIG. 6 depicts a system 600 as an arrangement of computing modules that are interconnected so as to operate cooperatively to implement certain of the herein-disclosed embodiments. This and other embodiments present particular arrangements of elements that, individually and/or as combined, serve to form improved technological processes that address data loss when interacting with an eventually consistent storage environment. The partitioning of system 600 is merely illustrative and other partitions are possible. As an option, the system 600 may be implemented in the context of the architecture and functionality of the embodiments described herein. Of course, however, the system 600 or any operation therein may be carried out in any desired environment. The system 600 comprises at least one processor and at least one memory, the memory serving to store program instructions corresponding to the operations of the system. As shown, an operation can be implemented in whole or in part using program instructions accessible by a module. The modules are connected to a communication path 605, and any operation can communicate with other operations over communication path 605. The modules of the system can, individually or in combination, perform method operations within system 600. Any operations performed within system 600 may be performed in any order unless as may be specified in the claims. The shown embodiment implements a portion of a computer system, presented as system 600, comprising one or more computer processors to execute a set of program code instructions (module 610) and modules for accessing memory to hold program code instructions to perform: receiving one or more file system calls from a first storage environment, the file system calls issued to perform one or more data operations at a second storage environment (module 620); recording a first set of metadata in an object consistency metastore, the first set of metadata associated with at least a portion of the file system calls (module 630); accessing a second set of metadata from the second storage environment (module 640); comparing the first set of metadata and the second set of metadata to determine one or more comparison results (module 650); and executing a time delay when there are differences between first set of metadata and the second set of metadata (module 660).

Variations of the foregoing may include more or fewer of the shown modules. Certain variations may perform more or fewer (or different) steps, and/or certain variations may use data elements in more, or in fewer (or different) operations. Some variations include computer-executable instructions to carry out operations of method steps.

In particular, one group of instructions implements a virtual file system that facilitates file operations between a cloud-based collaboration system and a cloud-based storage repository. In this particular embodiment, the virtual file system comprises a first set of instructions to identify a file system call intercept point of the cloud-based collaboration system. A second set of instructions is configured to perform steps of: intercepting a file system call from the cloud-based collaboration system, the file system call being issued to perform the file operations at the cloud-based storage repository; invoking at least one virtual file system method before issuing the file operations to the cloud-based storage repository; and recording a first set of metadata in an object consistency metastore.

In example embodiments, the virtual file system is further configured to access a second set of metadata from the cloud-based storage repository before applying first rules to first entries in the first set of metadata, so as to convert at least a portion of the entries into a common format for comparison. Second rules can be applied to second entries in the second set of metadata to convert at least a portion of the entries into the common format for comparison, then comparing, via the common format, the first set of metadata to the second set of metadata to determine comparison results. Upon determining that there are differences between the first set of metadata and the second set of metadata, then a time delay is executed. After the time delay, the virtual file system again accesses the second set of metadata from the cloud-based storage repository to again check if there still remain differences between the first set of metadata and the second set of metadata.

In some cases, the virtual file system includes further instructions to send results of the file operations to the cloud-based collaboration system after it is determined that the first set of metadata is consistent with the second set of metadata.

System Architecture Overview

Additional System Architecture Examples

Figure 7A:
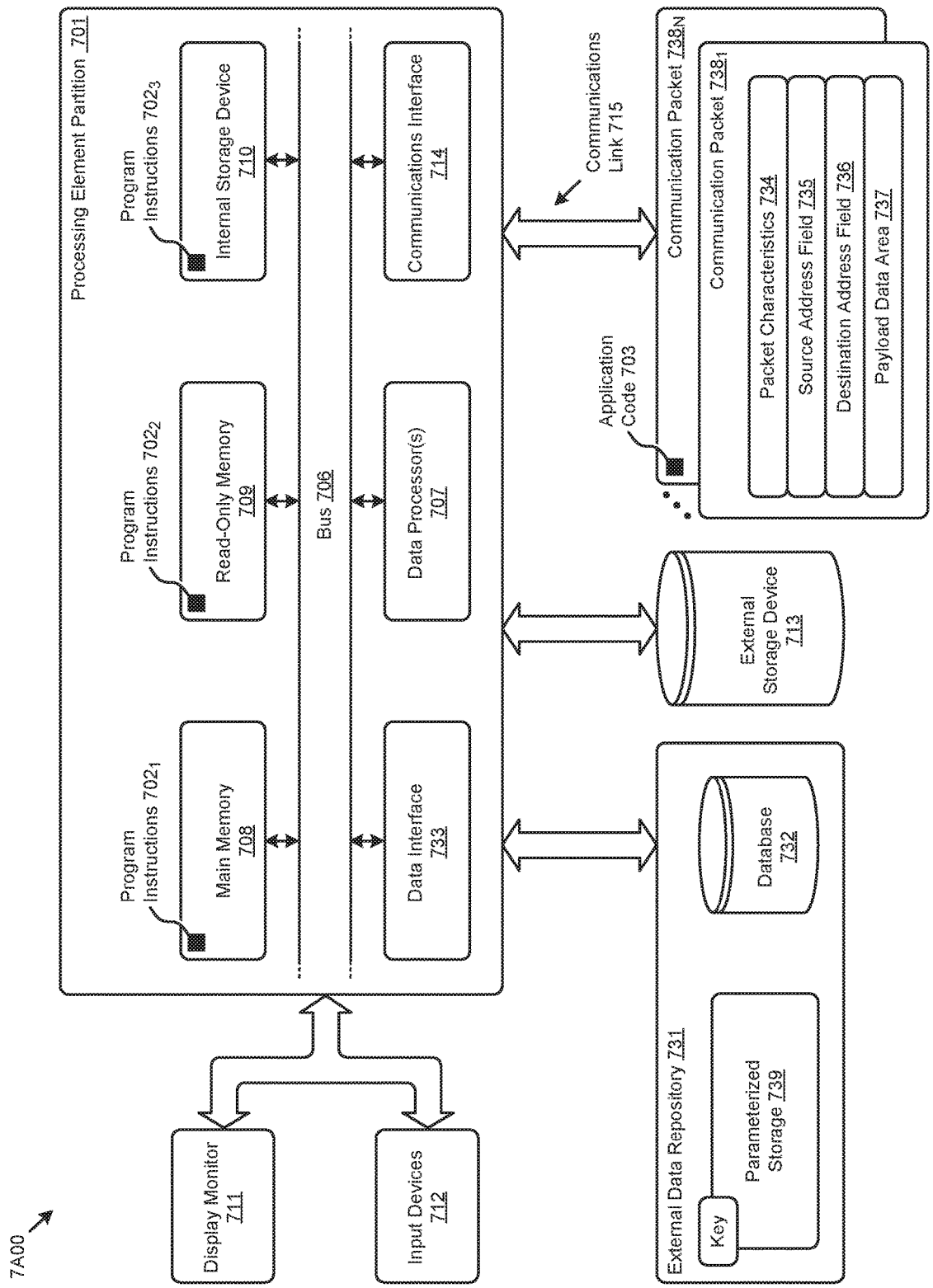
FIG. 7A and FIG. 7B present block diagrams of computer system architectures having components suitable for implementing embodiments of the present disclosure, and/or for use in the herein-described environments.

FIG. 7A depicts a block diagram of an instance of a computer system 7A00 suitable for implementing embodiments of the present disclosure. Computer system 7A00 includes a bus 706 or other communication mechanism for communicating information. The bus interconnects subsystems and devices such as a central processing unit (CPU), or a multi-core CPU (e.g., data processor 707), a system memory (e.g., main memory 708, or an area of random access memory (RAM)), a non-volatile storage device or non-volatile storage area (e.g., read-only memory 709), an internal storage device 710 or external storage device 713 (e.g., magnetic or optical), a data interface 733, a communications interface 714 (e.g., PHY, MAC, Ethernet interface, modem, etc.). The aforementioned components are shown within processing element partition 701, however other partitions are possible. Computer system 7A00 further comprises a display 711 (e.g., CRT or LCD), various input devices 712 (e.g., keyboard, cursor control), and an external data repository 731.

According to an embodiment of the disclosure, computer system 7A00 performs specific operations by data processor 707 executing one or more sequences of one or more program code instructions contained in a memory. Such instructions (e.g., program instructions $702_1$, program instructions $702_2$, program instructions $702_3$, etc.) can be contained in or can be read into a storage location or memory from any computer readable/usable storage medium such as a static storage device or a disk drive. The sequences can be organized to be accessed by one or more processing entities configured to execute a single process or configured to execute multiple concurrent processes to perform work. A processing entity can be hardware-based (e.g., involving one or more cores) or software-based, and/or can be formed using a combination of hardware and software that implements logic, and/or can carry out computations and/or processing steps using one or more processes and/or one or more tasks and/or one or more threads or any combination thereof.

According to an embodiment of the disclosure, computer system 7A00 performs specific networking operations using one or more instances of communications interface 714. Instances of communications interface 714 may comprise one or more networking ports that are configurable (e.g., pertaining to speed, protocol, physical layer characteristics, media access characteristics, etc.) and any particular instance of communications interface 714 or port thereto can be configured differently from any other particular instance. Portions of a communication protocol can be carried out in whole or in part by any instance of communications interface 714, and data (e.g., packets, data structures, bit fields, etc.) can be positioned in storage locations within communications interface 714, or within system memory, and such data can be accessed (e.g., using random access addressing, or using direct memory access DMA, etc.) by devices such as data processor 707.

Communications link 715 can be configured to transmit (e.g., send, receive, signal, etc.) any types of communications packets (e.g., communication packet $738_1$, communication packet 738N) comprising any organization of data items. The data items can comprise a payload data area 737, a destination address 736 (e.g., a destination IP address), a source address 735 (e.g., a source IP address), and can include various encodings or formatting of bit fields to populate packet characteristics 734. In some cases, the packet characteristics include a version identifier, a packet or payload length, a traffic class, a flow label, etc. In some cases, payload data area 737 comprises a data structure that is encoded and/or formatted to fit into byte or word boundaries of the packet.

In some embodiments, hard-wired circuitry may be used in place of or in combination with software instructions to implement aspects of the disclosure. Thus, embodiments of the disclosure are not limited to any specific combination of hardware circuitry and/or software. In embodiments, the term "logic" shall mean any combination of software or hardware that is used to implement all or part of the disclosure.

The term "computer readable medium" or "computer usable medium" as used herein refers to any medium that participates in providing instructions to data processor 707 for execution. Such a medium may take many forms including, but not limited to, non-volatile media and volatile media. Non-volatile media includes, for example, optical or magnetic disks such as disk drives or tape drives. Volatile media includes dynamic memory such as RAM.

Common forms of computer readable media include, for example, floppy disk, flexible disk, hard disk, magnetic tape, or any other magnetic medium; CD-ROM or any other optical medium; punch cards, paper tape, or any other physical medium with patterns of holes; RAM, PROM, EPROM, FLASH-EPROM, or any other memory chip or cartridge, or any other non-transitory computer readable medium. Such data can be stored, for example, in any form of external data repository 731, which in turn can be formatted into any one or more storage areas, and which can comprise parameterized storage 739 accessible by a key (e.g., filename, table name, block address, offset address, etc.).

Execution of the sequences of instructions to practice certain embodiments of the disclosure are performed by a single instance of a computer system 7A00. According to certain embodiments of the disclosure, two or more instances of computer system 7A00 coupled by a communications link 715 (e.g., LAN, public switched telephone network, or wireless network) may perform the sequence of instructions required to practice embodiments of the disclosure using two or more instances of components of computer system 7A00.

Computer system 7A00 may transmit and receive messages such as data and/or instructions organized into a data structure (e.g., communications packets). The data structure can include program instructions (e.g., application code 703), communicated through communications link 715 and communications interface 714. Received program code may be executed by data processor 707 as it is received and/or stored in the shown storage device or in or upon any other non-volatile storage for later execution. Computer system 7A00 may communicate through a data interface 733 to a database 732 on an external data repository 731. Data items in a database can be accessed using a primary key (e.g., a relational database primary key).

Processing element partition 701 is merely one sample partition. Other partitions can include multiple data processors, and/or multiple communications interfaces, and/or multiple storage devices, etc. within a partition. For example, a partition can bound a multi-core processor (e.g., possibly including embedded or co-located memory), or a partition can bound a computing cluster having plurality of computing elements, any of which computing elements are connected directly or indirectly to a communications link. A first partition can be configured to communicate to a second partition. A particular first partition and particular second partition can be congruent (e.g., in a processing element array) or can be different (e.g., comprising disjoint sets of components).

A module as used herein can be implemented using any mix of any portions of the system memory and any extent of hard-wired circuitry including hard-wired circuitry embodied as a data processor 707. Some embodiments include one or more special-purpose hardware components (e.g., power control, logic, sensors, transducers, etc.). Some embodiments of a module include instructions that are stored in a memory for execution so as to facilitate operational and/or performance characteristics pertaining to virtually consistent file systems in eventually consistent storage environments. A module may include one or more state machines and/or combinational logic used to implement or facilitate the operational and/or performance characteristics pertaining to implementing virtually consistent file systems in eventually consistent storage environments.

Various implementations of database 732 comprise storage media organized to hold a series of records or files such that individual records or files are accessed using a name or key (e.g., a primary key or a combination of keys and/or query clauses). Such files or records can be organized into one or more data structures (e.g., data structures used to implement or facilitate aspects of virtually consistent file systems in eventually consistent storage environments). Such files, records, or data structures can be brought into and/or stored in volatile or non-volatile memory. More specifically, the occurrence and organization of the foregoing files, records, and data structures improve the way that the computer stores and retrieves data in memory, for example, to improve the way data is accessed when the computer is performing operations pertaining to virtually consistent file systems in eventually consistent storage environments, and/or for improving the way data is manipulated when performing computerized operations pertaining to implementing a consistency layer that facilitates data consistency in the presence of asynchronous interactions with an eventually consistent storage environment.

Figure 7B:
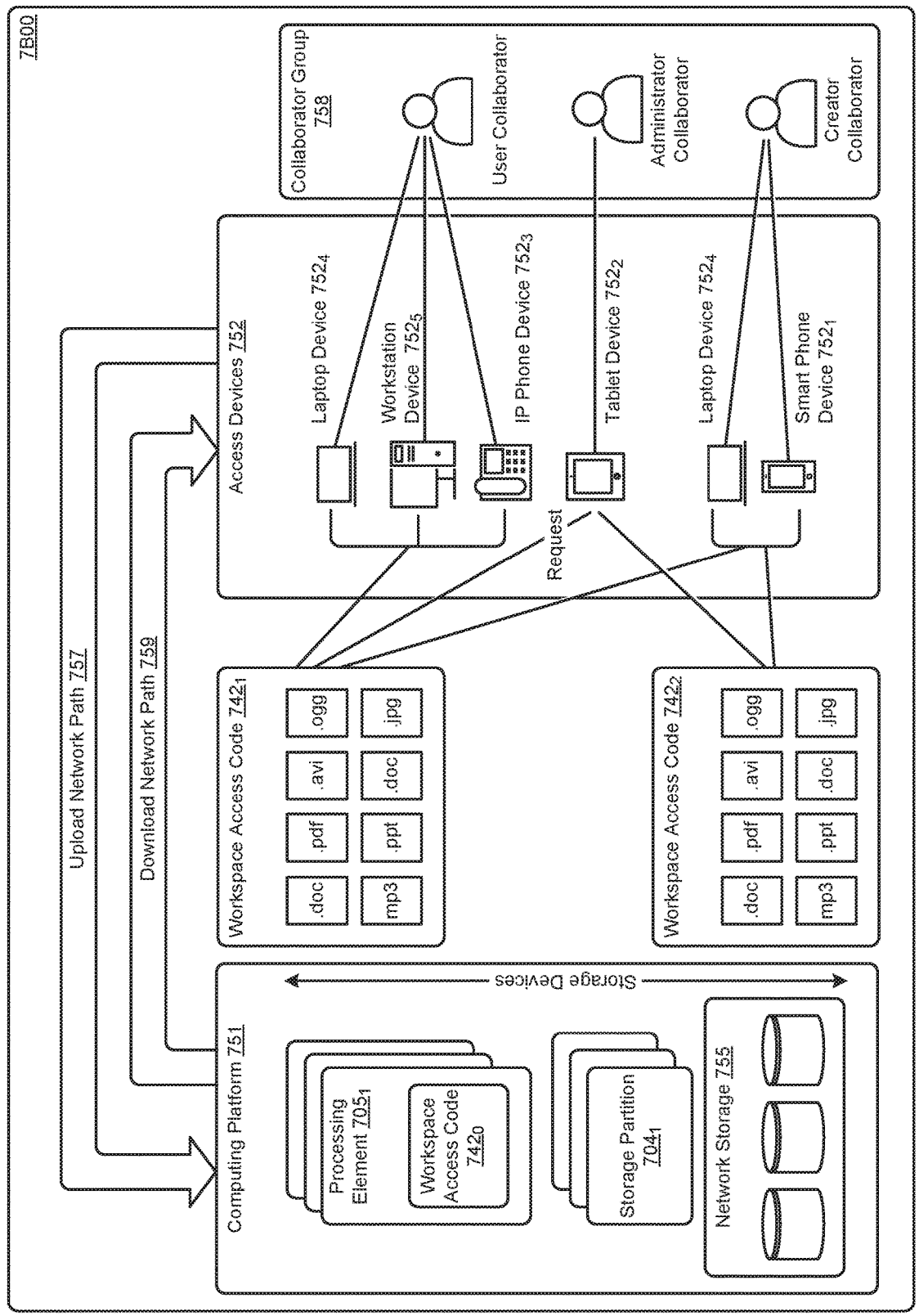

FIG. 7B depicts a block diagram of an instance of a cloud-based environment 7B00. Such a cloud-based environment supports access to workspaces through the execution of workspace access code (e.g., workspace access code $742_0$, workspace access code $742_1$, and workspace access code $742_2$). Workspace access code can be executed on any of access devices 752 (e.g., laptop device $752_4$, workstation device $752_5$, IP phone device $752_3$, tablet device $752_2$, smart phone device $752_1$, etc.). A group of users can form a collaborator group 758, and a collaborator group can be composed of any types or roles of users. For example, and as shown, a collaborator group can comprise a user collaborator, an administrator collaborator, a creator collaborator, etc. Any user can use any one or more of the access devices, and such access devices can be operated concurrently to provide multiple concurrent sessions and/or other techniques to access workspaces through the workspace access code.

A portion of workspace access code can reside in and be executed on any access device. Any portion of the workspace access code can reside in and be executed on any computing platform 751, including in a middleware setting. As shown, a portion of the workspace access code resides in and can be executed on one or more processing elements (e.g., processing element $705_1$). The workspace access code can interface with storage devices such as networked storage 755. Storage of workspaces and/or any constituent files or objects, and/or any other code or scripts or data can be stored in any one or more storage partitions (e.g., storage partition $704_1$). In some environments, a processing element includes forms of storage, such as RAM and/or ROM and/or FLASH, and/or other forms of volatile and non-volatile storage.

A stored workspace can be populated via an upload (e.g., an upload from an access device to a processing element over an upload network path 757). A stored workspace can be delivered to a particular user and/or shared with other particular users via a download (e.g., a download from a processing element to an access device over a download network path 759).

In the foregoing specification, the disclosure has been described with reference to specific embodiments thereof. It will however be evident that various modifications and changes may be made thereto without departing from the broader spirit and scope of the disclosure. For example, the above-described process flows are described with reference to a particular ordering of process actions. However, the ordering of many of the described process actions may be changed without affecting the scope or operation of the disclosure. The specification and drawings are to be regarded in an illustrative sense rather than in a restrictive sense.

What is claimed is:

1. A method for implementing a file system to provide data consistency pertaining to asynchronous interactions between heterogeneous storage systems, the method comprising:
   maintaining a first storage environment and a second storage environment different from the first storage environment,
      the first storage environment comprising a synchronously consistent file system having a set of synchronously consistent metadata,
      the second storage environment comprising an asynchronously consistent file system having two sets of metadata,
      a first set of metadata of the two sets of metadata comprising object consistency metadata identifying an expected state of data after execution of respective write operations received at the virtually consistent file system,
      a second set of metadata of the two sets of metadata representing a state of the virtually consistent file system after execution of one or more of the respective write operations, and
      wherein respective read requests from the first storage environment are processed by comparing the object consistency metadata and the second set of metadata of the two sets of metadata to determine if the respective read request can be processed without delaying the execution of the read request at the asynchronously consistent file system; and
   receiving a first file system call, from the first storage environment having the synchronously consistent file system, and at the second storage environment having the virtually consistent file system, the first file system call requesting a write operation at the virtually consistent file system of the second storage environment, the virtually consistent file system comprising a consistency layer and an asynchronously consistent file system, the write operation specifying a set of data be written to the asynchronously consistent file system of the second storage environment;
   recording, in response to receiving the first file system call from the first storage environment, object consistency metadata in an object consistency metadata store of the consistency layer of the virtually consistent file system, the object consistency metadata identifying an expected state of data after execution of the requested write operation received at the virtually consistent file system of the second storage environment;
   issuing an operation to the asynchronously consistent file system to write the set of data, wherein the asynchronously consistent file system maintains a second set of metadata separate from the object consistency metadata in the object consistency metadata store, and the second set of metadata is to be updated to reflect the set of data having been written to the asynchronously consistent file system after the operation has been completed;
   receiving a second file system call requesting a read operation on the virtually consistent file system of the second storage environment after receiving the first file system call; and
   processing the request for the read operation at least by:
      accessing the object consistency metadata in the object consistency metadata store and the second set of metadata of the virtually consistent file system of the second storage environment;
      comparing the object consistency metadata and the second set of metadata of the virtually consistent file system to determine whether there is a pending write operation corresponding to the read operation that has not yet completed; and
      executing, in response to determining that there is a pending write operation corresponding to the read operation that has not yet completed, a time delay before performing the read operation.

2. The method of claim 1, wherein the first file system call is structured based at least in part on one or more virtual file system methods.

3. The method of claim 2, wherein the virtual file system methods comprise one or more write methods, one or more read methods, a put method, a delete method, a rename method, a list method, or a move method.

4. The method of claim 1, further comprising executing consistency operations that comprise at least one of, throwing an exception, manipulating the object consistency metadata, issuing at least one alert, or invoking at least one data operation at the second storage environment.

5. The method of claim 1, wherein one or more subject objects associated with the first file system call is partitioned into two or more batches.

6. The method of claim 5, wherein two or more data operations corresponding to the two or more batches are issued to the second storage environment.

7. The method of claim 1, wherein the first storage environment is a consistent storage environment.

8. The method of claim 1, wherein the second storage environment is an eventually consistent storage environment.

9. The method of claim 1, further comprising performing a set of clean-up operations on the object consistency metadata store.

10. The method of claim 9, wherein the set of clean-up operations comprise at least one of, purging data, or performing a garbage collection operation over the object consistency metadata store.

11. A non-transitory computer readable medium having stored thereon a set of instructions which, when executed by a processor causes a set of acts for implementing a file system to provide data consistency pertaining to asynchronous interactions between heterogeneous storage systems, the set of acts comprising:
  maintaining a first storage environment and a second storage environment different from the first storage environment,
    the first storage environment comprising a synchronously consistent file system having a set of synchronously consistent metadata,
    the second storage environment comprising an asynchronously consistent file system having two sets of metadata,
    a first set of metadata of the two sets of metadata comprising object consistency metadata identifying an expected state of data after execution of respective write operations received at the virtually consistent file system,
    a second set of metadata of the two sets of metadata representing a state of the virtually consistent file system after execution of one or more of the respective write operations, and
    wherein respective read requests from the first storage environment are processed by comparing the object consistency metadata and the second set of metadata of the two sets of metadata to determine if the respective read request can be processed without delaying the execution of the read request at the asynchronously consistent file system; and
  receiving a first file system call, from the first storage environment having the synchronously consistent file system, and at the second storage environment having the virtually consistent file system, the first file system call requesting a write operation at the virtually consistent file system of the second storage environment, the virtually consistent file system comprising a consistency layer and an asynchronously consistent file system, the write operation specifying a set of data be written to the asynchronously consistent file system of the second storage environment;
  recording, in response to receiving the first file system call from the first storage environment, object consistency metadata in an object consistency metadata store of the consistency layer of the virtually consistent file system, the object consistency metadata identifying an expected state of data after execution of the requested write operation received at the virtually consistent file system of the second storage environment;
  issuing an operation to the asynchronously consistent file system to write the set of data, wherein the asynchronously consistent file system maintains a second set of metadata separate from the object consistency metadata in the object consistency metadata store, and the second set of metadata is to be updated to reflect the set of data having been written to the asynchronously consistent file system after the operation has been completed;
  receiving a second file system call requesting a read operation on the virtually consistent file system of the second storage environment after receiving the first file system call; and
  processing the request for the read operation at least by:
    accessing the object consistency metadata in the object consistency metadata store and the second set of metadata of the virtually consistent file system of the second storage environment;
    comparing the object consistency metadata and the second set of metadata of the virtually consistent file system to determine whether there is a pending write operation corresponding to the read operation that has not yet completed; and
    executing, in response to determining that there is a pending write operation corresponding to the read operation that has not yet completed, a time delay before performing the read operation.

12. The computer readable medium of claim 11, wherein the first file system call is structured based at least in part on one or more virtual file system methods.

13. The computer readable medium of claim 12, wherein the virtual file system methods comprise one or more write methods, one or more read methods, a put method, a delete method, a rename method, a list method, or a move method.

14. The computer readable medium of claim 11, wherein the set of acts further comprise executing consistency operations that comprise at least one of, throwing an exception, manipulating the object consistency metadata, issuing at least one alert, or invoking at least one data operation at the second storage environment.

15. The computer readable medium of claim 11, wherein one or more subject objects associated with the first file system call is partitioned into two or more batches.

16. The computer readable medium of claim 11, wherein the first storage environment is a consistent storage environment.

17. The computer readable medium of claim 11, wherein the second storage environment is an eventually consistent storage environment.

18. A system for implementing a file system to provide data consistency pertaining to asynchronous interactions between heterogeneous storage systems, the system comprising:
  a storage medium having stored thereon a set of instructions; and
  a processor that executes the set of instructions to cause a set of acts, the set of acts comprising,
    maintaining a first storage environment and a second storage environment different from the first storage environment,
      the first storage environment comprising a synchronously consistent file system having a set of synchronously consistent metadata,
      the second storage environment comprising an asynchronously consistent file system having two sets of metadata,
      a first set of metadata of the two sets of metadata comprising object consistency metadata identifying an expected state of data after execution of respective write operations received at the virtually consistent file system,
      a second set of metadata of the two sets of metadata representing a state of the virtually consistent file system after execution of one or more of the respective write operations, and wherein respective read requests from the first storage environment are processed by comparing the object consistency metadata and the second set of metadata of the two sets of metadata to determine if the respective read request can be processed without delaying the execution of the read request at the asynchronously consistent file system; and receiving a first file system call, from the first storage environment having the synchronously consistent file system, and at the second storage environment having the virtually consistent file system, the first file system call requesting a write operation at the virtually consistent file system of the second storage environment, the virtually consistent file system comprising a consistency layer and an asynchronously consistent file system, the write operation specifying a set of data be written to the asynchronously consistent file system of the second storage environment;

recording, in response to receiving the first file system call from the first storage environment, object consistency metadata in an object consistency metadata store of the consistency layer of the virtually consistent file system, the object consistency metadata identifying an expected state of data after execution of the requested write operation received at the virtually consistent file system of the second storage environment;

issuing an operation to the asynchronously consistent file system to write the set of data, wherein the asynchronously consistent file system maintains a second set of metadata separate from the object consistency metadata in the object consistency metadata store, and the second set of metadata is to be updated to reflect the set of data having been written to the asynchronously consistent file system after the operation has been completed;

receiving a second file system call requesting a read operation on the virtually consistent file system of the second storage environment after receiving the first file system call; and processing the request for the read operation at least by:
  accessing the object consistency metadata in the object consistency metadata store and the second set of metadata of the virtually consistent file system of the second storage environment;
  comparing the object consistency metadata and the second set of metadata of the virtually consistent file system to determine whether there is a pending write operation corresponding to the read operation that has not yet completed; and
  executing, in response to determining that there is a pending write operation corresponding to the read operation that has not yet completed, a time delay before performing the read operation.

19. The system of claim 18, wherein the first storage environment is a consistent storage environment.

20. The system of claim 18, wherein the second storage environment is an eventually consistent storage environment.

* * * * *